United States Patent
Malik et al.

(10) Patent No.: US 10,555,203 B2
(45) Date of Patent: Feb. 4, 2020

(54) CHANNEL RESERVATION TECHNIQUES FOR MILLIMETER WAVE SYSTEMS

(71) Applicant: QUALCOMM Incorporated, San Diego, CA (US)

(72) Inventors: Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/914,844

(22) Filed: Mar. 7, 2018

(65) Prior Publication Data

US 2018/0279156 A1  Sep. 27, 2018

Related U.S. Application Data

(60) Provisional application No. 62/474,890, filed on Mar. 22, 2017.

(51) Int. Cl.
*H04J 3/00* (2006.01)
*H04W 28/02* (2009.01)
(Continued)

(52) U.S. Cl.
CPC .... *H04W 28/0205* (2013.01); *H04B 7/15592* (2013.01); *H04W 28/26* (2013.01);
(Continued)

(58) Field of Classification Search
CPC .......................... H04W 28/0205; H04B 7/0617
See application file for complete search history.

(56) References Cited

U.S. PATENT DOCUMENTS

2006/0209772 A1  9/2006  Fang et al.
2011/0287796 A1  11/2011  Jain et al.
(Continued)

OTHER PUBLICATIONS

Ko Y-B., et al., "Medium access control protocols using directional antennas in ad hoc networks" Infocom 2000. Nineteenth Annual Joint Conference of the IEEE Computer and Communications Societies. Proceedings. IEEE Tel Aviv, Israel Mar. 26-30, 2000, Piscataway, NJ, USA,IEEE, US, vol. 1, Mar. 26, 2000 (Mar. 26, 2000), XP010376001, pp. 13-21.
(Continued)

*Primary Examiner* — Bo Hui A Zhu
(74) *Attorney, Agent, or Firm* — Holland & Hart LLP

(57) ABSTRACT

Methods, systems, and devices for wireless communication are described. A first device may receive a channel reservation request from a second device, over a shared or unlicensed radio frequency spectrum band, the channel reservation request including a first expected response time duration to receive a channel reservation response in response to the channel reservation request. The first wireless device may transmit a channel reservation response in response, and receive a directional transmission according to the channel reservation request. The second device may transmit a directional channel reservation request on a transmit beam, the directional channel reservation request including a first expected response time duration to receive a channel reservation response the first device in response to the directional channel reservation request. The second device may receive the channel reservation response during the first expected response time duration and transmit a directional transmission according to the directional channel reservation request.

27 Claims, 19 Drawing Sheets

(51) Int. Cl.
| | |
|---|---|
| *H04B 7/155* | (2006.01) |
| *H04W 72/08* | (2009.01) |
| *H04W 28/26* | (2009.01) |
| *H04W 72/04* | (2009.01) |
| *H04W 74/00* | (2009.01) |
| *H04W 72/12* | (2009.01) |
| *H04W 84/04* | (2009.01) |

(52) U.S. Cl.
CPC ....... *H04W 72/042* (2013.01); *H04W 72/085* (2013.01); *H04W 72/121* (2013.01); *H04W 74/006* (2013.01); *H04W 84/047* (2013.01)

(56) References Cited

U.S. PATENT DOCUMENTS

| | | |
|---|---|---|
| 2012/0307673 A1 | 12/2012 | Chang et al. |
| 2015/0312793 A1 | 10/2015 | Jeon et al. |
| 2016/0270120 A1 | 9/2016 | Kronander et al. |
| 2017/0105224 A1* | 4/2017 | Ghanbarinejad ..... H04L 5/0055 |
| 2017/0164241 A1 | 6/2017 | Kasher et al. |
| 2017/0222852 A1 | 8/2017 | Eitan et al. |

OTHER PUBLICATIONS

Anonymous: "Proposed Changes to Tgs Proposal to Add Ccc Mac; 11-06-0599-00-000s-proposed-changes-to-tgs-proposal-to-add-ccc-mac", IEEE Draft; 11-06-0599-00-000S-PROPOSED-CHANGES-TO-TGS-PROPOSAL-TO-ADD-CCC-MAC, IEEE-SA Mentor, Piscataway, NJ USA, vol. 802.11s, May 2, 2006, XP017687215, pp. 1-13, [retrieved on May 2, 2006].

Cho S: "Contention-based Directly MAC Protocols: A Survey; 11-09-0796-00-00ad-content-based-directional-mac-protocols-a-survey", IEEE Draft; 11-09-0796-00-00AD-CONTENTION-BASED-DIRECTIONAL-MAC-PROTOCOLS-A-SURVEY, IEEE-SA Mentor, Piscataqay, NJ USA, vol. 802.11ad, Jul. 14, 2009, XP017678588, pp. 1-43.

International Search Report and Written Opinion—PCT/US2018/021520—ISA/EPO—dated Jul. 6, 2018 (173576WO).

* cited by examiner

US 10,555,203 B2

CHANNEL RESERVATION TECHNIQUES FOR MILLIMETER WAVE SYSTEMS

CROSS REFERENCES

The present Application for Patent claims priority to U.S. Provisional Patent Application No. 62/474,890 by MALIK, et al., entitled "Channel Reservation Techniques For Millimeter Wave Systems," filed Mar. 22, 2017, assigned to the assignee hereof.

BACKGROUND

The following relates generally to wireless communication, and more specifically to channel reservation techniques for millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE). A base station may communicate with UEs on downlink channels (e.g., for transmissions from a base station to a UE) and uplink channels (e.g., for transmissions from a UE to a base station).

Wireless communication devices may communicate via a wireless medium (e.g., in a particular frequency band of a radio frequency spectrum band). In some cases, a portion of the spectrum may be licensed such that a single operator manages transmissions on that medium (e.g., a cellular network operator that has exclusive rights to transmit in a particular frequency range in a particular area). In some cases, a portion of the spectrum may be licensed, but shared between multiple operators. In other cases, a portion of the spectrum may be unlicensed such that no particular entity may exclusively transmit on the wireless medium (e.g., the 2.4 GHz frequency band used by certain Wi-Fi devices). As the number of wireless devices operating in shared or unlicensed spectrum increases, it is increasingly important for the many devices that may access the wireless medium use the wireless medium efficiently.

SUMMARY

A wireless device seeking to transmit one or more data frames in a directional mode, which may also be called an initiating device, may transmit a channel reservation request to reserve a medium (e.g., such as a shared or unlicensed radio frequency (RF) spectrum band) for the transmission. The channel reservation request may include a value based on the expected length of time needed to receive a channel reservation response from a wireless device to which the channel reservation is addressed, which may also be called a responding device. The value may be an expected response time duration. Other devices that receive the channel reservation request may defer from transmitting on the medium based on the expected response time duration (e.g., the value indicated by the channel reservation request), which may allow the initiating device sufficient time to receive the channel reservation response from the responding device. The expected response time duration may indicate a time period that ends prior to when the initiating device transmits one or more data frames to the responding device. The initiating device may transmit a directional channel reservation request, for example using beamforming techniques, in the direction of the responding device. This may provide protection for the transmission of a channel reservation response, by the responding device, from transmissions by other wireless devices in the direction of the responding device. The initiating device may also transmit an omnidirectional (for example, non-beamformed or local) channel reservation request, which may provide protection for the receipt of the channel reservation response at the initiating device.

In response to the channel reservation request, the responding device may transmit a channel reservation response to the initiating device. The responding device may transmit an omnidirectional channel reservation response, or a directional channel reservation response, or both. Other wireless devices that receive at least one channel reservation response may defer from transmitting on the medium for a duration specified in the channel reservation response. The duration may include an expected duration for the initiating device to make a directional transmission to, or receive a directional transmission from, the responding device, in order to avoid interference with the transmission and receipt of the directional transmission. For example, a device may defer from transmitting during the relevant time period based on, e.g., the type of the received channel reservation response (omnidirectional or directional), the signal strength of the received channel reservation response, and/or whether the received channel reservation response is directed to that device. The channel reservation response may provide protection for the transmission of the directional transmissions from wireless devices near the responding device, or in the direction of the initiating device, or both. In some cases, known jamming devices may be silenced by transmitting directional channel reservation responses from the responding device in the direction of the jamming devices.

The duration indicated in the channel reservation response may also include a time period for the transmission of an acknowledgement. In some case, the channel reservation request may include a two-part duration, one part covering the expected response time for the channel reservation response prior to the directional transmission, and a second part covering an acknowledgement to follow the directional transmission.

A method of for wireless communication is described. The method may include transmitting, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The method may further include receiving the channel reservation response from the second wireless device during the first expected response time duration, and transmitting, to the second wireless device, a directional transmission according to the directional channel reservation request.

An apparatus for wireless communication is described. The apparatus may include means for transmitting, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The apparatus may further include means for receiving the channel reservation response from the second wireless device during the first expected response time duration, and means for transmitting, to the second wireless device, a directional transmission according to the directional channel reservation request.

Another apparatus for wireless communication is described. The apparatus may include a processor, memory in electronic communication with the processor, and instructions stored in the memory. The instructions may be operable to cause the processor to transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The instructions may be further operable to cause the processor to receive the channel reservation response from the second wireless device during the first expected response time duration, and transmit, to the second wireless device, a directional transmission according to the directional channel reservation request.

A non-transitory computer readable medium for wireless communication is described. The non-transitory computer-readable medium may include instructions operable to cause a processor to transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The non-transitory computer-readable medium may further include instructions operable to cause a processor to receive the channel reservation response from the second wireless device during the first expected response time duration, and transmit, to the second wireless device, a directional transmission according to the directional channel reservation request.

In some examples of the method, apparatus, and non-transitory computer-readable medium described above, the directional channel reservation request further comprises: a second duration indicating an expected time for the first wireless device to receive an acknowledgement transmission in response to the directional transmission.

Some examples of the method, apparatus, and non-transitory computer-readable medium described above may further include processes, features, means, or instructions for transmitting, by the first wireless device, a second channel reservation response following the directional transmission, the second channel reservation response including a second expected response time duration for the first wireless device to receive an acknowledgement transmission in response to the directional transmission.

Some examples of the method, apparatus, and non-transitory computer-readable medium described above may further include processes, features, means, or instructions for transmitting an omnidirectional channel reservation request over the shared radio frequency spectrum band, the omnidirectional channel reservation request comprising a second expected response time duration for the first wireless device to receive the channel reservation response from the second wireless device in response to the directional channel reservation request.

In some examples of the method, apparatus, and non-transitory computer-readable medium described above, the directional channel reservation request may be transmitted prior to the omnidirectional channel reservation request, and the first expected response time duration may be longer than the second expected response time duration. In some examples of the method, apparatus, and non-transitory computer-readable medium described above, the omnidirectional channel reservation request may be transmitted prior to the directional channel reservation request, and the second expected response time duration may be longer than the first expected response time duration.

In some examples of the method, apparatus, and non-transitory computer-readable medium described above, receiving the channel reservation response comprises: receiving the channel reservation response from the second wireless device on a receive beam over the shared radio frequency spectrum band. Some examples of the method, apparatus, and non-transitory computer-readable medium described above may further include processes, features, means, or instructions for transmitting the directional transmission to the second wireless device on a transmit beam over the shared radio frequency spectrum band.

Some examples of the method, apparatus, and non-transitory computer-readable medium described above may further include processes, features, means, or instructions for receiving, on a receive beam over the shared radio frequency spectrum band, an acknowledgement in response to the directional transmission. Some examples of the method, apparatus, and non-transitory computer-readable medium described above may further include processes, features, means, or instructions for performing a contention-based protocol prior to transmitting the directional channel reservation request over the shared radio frequency spectrum band.

In some examples of the method, apparatus, and non-transitory computer-readable medium described above, the first expected response time duration includes a time duration for the first wireless device to receive a directional channel reservation response from the second wireless device, or a time duration for the first wireless device to receive an omnidirectional channel reservation response from the second wireless device, or a combination thereof.

In some examples of the method, apparatus, and non-transitory computer-readable medium described above, the directional transmission is transmitted using a different transmit beam than the transmit beam of the directional channel reservation request.

A method of for wireless communication is described. The method may include receiving a channel reservation request from a second wireless device over a shared radio frequency spectrum band, the channel reservation request including a first expected response time duration for the second wireless device to receive a channel reservation response in response to the channel reservation request. The method may further include transmitting, during the first expected response time duration, the channel reservation response in response to the received channel reservation request, and receiving, from the second wireless device, a directional transmission according to the channel reservation request.

An apparatus for wireless communication is described. The apparatus may include means for receiving a channel reservation request from a second wireless device over a shared radio frequency spectrum band, the channel reservation request including a first expected response time duration for the second wireless device to receive a channel reservation response in response to the channel reservation request. The apparatus may further include means for transmitting, during the first expected response time duration, the channel reservation response in response to the received channel reservation request, and means for receiving, from the second wireless device, a directional transmission according to the channel reservation request.

Another apparatus for wireless communication is described. The apparatus may include a processor, memory in electronic communication with the processor, and instructions stored in the memory. The instructions may be operable to cause the processor to receive a channel reservation request from a second wireless device over a shared radio frequency spectrum band, the channel reservation request including a first expected response time duration for the second wireless device to receive a channel reservation response in response to the channel reservation request. The instructions may further be operable to cause the processor to transmit, during the first expected response time duration, the channel reservation response in response to the received channel reservation request, and receive, from the second wireless device, a directional transmission according to the channel reservation request.

A non-transitory computer readable medium for wireless communication is described. The non-transitory computer-readable medium may include instructions operable to cause a processor to receive a channel reservation request from a second wireless device over a shared radio frequency spectrum band, the channel reservation request including a first expected response time duration for the second wireless device to receive a channel reservation response in response to the channel reservation request. The non-transitory computer-readable medium may further include instructions operable to cause a processor to transmit, during the first expected response time duration, the channel reservation response in response to the received channel reservation request, and receive, from the second wireless device, a directional transmission according to the channel reservation request.

In some examples of the method, apparatus, and non-transitory computer-readable medium described above, transmitting the channel reservation response comprises: transmitting, during the first expected response time duration, an omnidirectional channel reservation response in response to the received channel reservation request. Some examples of the method, apparatus, and non-transitory computer-readable medium described above may further include processes, features, means, or instructions for transmitting, during the first expected response time duration, a directional channel reservation response in response to the received channel reservation request.

In some examples of the method, apparatus, and non-transitory computer-readable medium described above, transmitting the channel reservation response comprises: transmitting, during the first expected response time duration, a first directional channel reservation response in response to the received channel reservation request. Some examples of the method, apparatus, and non-transitory computer-readable medium described above may further include processes, features, means, or instructions for transmitting, during the first expected response time duration, a second directional channel reservation response in response to the received channel reservation request, where the first directional channel reservation response and the second directional channel reservation response are directed to different wireless devices.

In some examples of the method, apparatus, and non-transitory computer-readable medium described above, transmitting the directional channel reservation response comprises: transmitting the directional channel reservation response to the second wireless device on a transmit beam over the shared radio frequency spectrum band. In some examples of the method, apparatus, and non-transitory computer-readable medium described above, transmitting the directional channel reservation response comprises: transmitting the directional channel reservation response to the second wireless device, the second wireless device to receive the directional channel reservation response on a receive beam over the shared radio frequency spectrum band.

In some examples of the method, apparatus, and non-transitory computer-readable medium described above, the omnidirectional channel reservation response comprises a second expected response time duration for the directional transmission to be received and an acknowledgment to be transmitted. In some examples of the method, apparatus, and non-transitory computer-readable medium described above, the directional channel reservation response comprises a third expected response time duration for the directional transmission to be received and an acknowledgment to be transmitted.

Some examples of the method, apparatus, and non-transitory computer-readable medium described above may further include processes, features, means, or instructions for receiving, in the channel reservation request, a second expected response time duration for the second wireless device to receive an acknowledgement transmission in response to the directional transmission. Some examples of the method, apparatus, and non-transitory computer-readable medium described above may further include processes, features, means, or instructions for transmitting, to the second wireless device during the second expected response time duration, an acknowledgement transmission in response to the directional transmission.

Some examples of the method, apparatus, and non-transitory computer-readable medium described above may further include processes, features, means, or instructions for receiving, from the second wireless device, a second channel reservation response, the second channel reservation response including a second expected response time duration for the second wireless device to receive an acknowledgement transmission in response to the directional transmission. Some examples of the method, apparatus, and non-transitory computer-readable medium described above may further include processes, features, means, or instructions for transmitting, to the second wireless device during the second expected response time duration, an acknowledgement transmission in response to the directional transmission.

Some examples of the method, apparatus, and non-transitory computer-readable medium described above may further include processes, features, means, or instructions for receiving the directional transmission from the second wireless device on a receive beam over the shared radio frequency spectrum band.

In some examples of the method, apparatus, and non-transitory computer-readable medium described above, transmitting the channel reservation response comprises: transmitting a first directional channel reservation response on a first transmit beam to an expected location of the second wireless device. Some examples of the method, apparatus, and non-transitory computer-readable medium described above may further include processes, features, means, or instructions for transmitting a second directional channel reservation response on a second transmit beam to an expected location of a third wireless device. Some examples of the method, apparatus, and non-transitory computer-readable medium described above may further include processes, features, means, or instructions for transmitting, on a transmit beam over the shared radio frequency spectrum band, an acknowledgement in response to the received directional transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
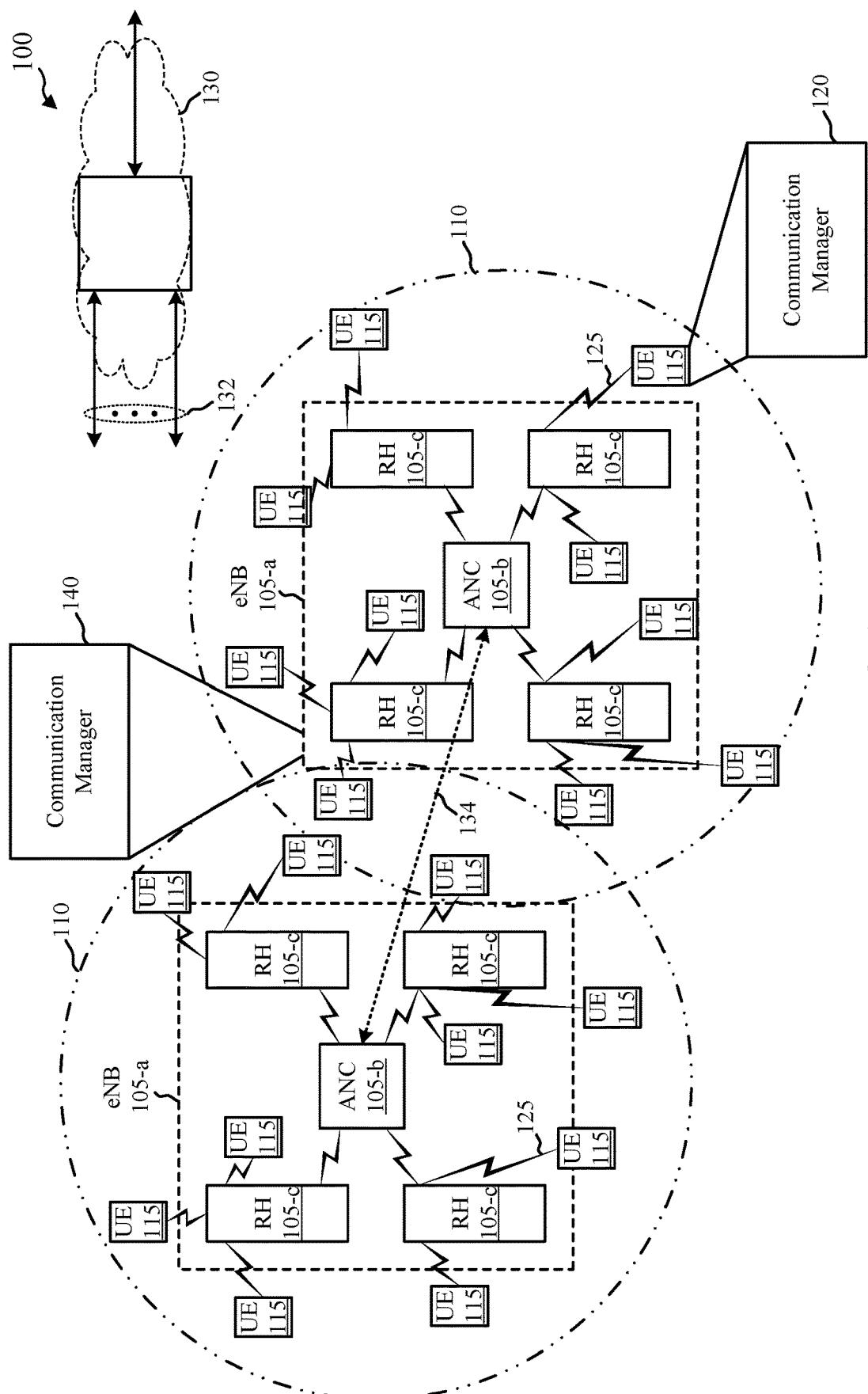
FIG. 1 illustrates an example of a system for wireless communication that supports channel reservation techniques for millimeter wave (mmW) systems in accordance with aspects of the present disclosure.

Wireless devices communicating on an unlicensed portion of a communication spectrum may use protection techniques to reserve a wireless medium for use. In some examples, these protection techniques reserve the medium for an entire sequence of messages between an initiating device and a responding device, on the theory that any device that can hear messages transmitted by the initiating device and/or the responding device may potentially interfere with the communications. However, such protection techniques may lead to over-silencing, preventing devices on the network from transmitting even though they would not interfere with the communications between the initiating device and the responding device.

Many wireless devices transmit in an omnidirectional mode, transmitting a signal that emanates from the wireless device in all directions. Using beamforming techniques, a wireless device may transmit in a directional mode that focuses the transmissions in the direction of an intended recipient. Such techniques may allow a device to extend its range, such that the device may communicate with devices farther away. In some cases, two devices located near each other, one transmitting in a directional mode and the other transmitting in an omnidirectional mode, may not interfere with each other's communications. For example, the intended recipient for the device transmitting in the directional mode may be out of range of the device transmitting in the omnidirectional mode, and the intended recipient of the device transmitting in the omnidirectional mode may be in a direction away from a beam used by the device transmitting in the directional mode. Similarly, two directional devices located near each other may be communicating in different directions, and therefore may not interfere. However, current protection techniques may over-silence the medium, such that the two wireless devices may not be able to transmit at the same time, even if they will not interfere with the other's communications. Using protection techniques further described below may allow two devices to transmit at least in part at the same time, but prevent transmissions where the third party transmissions would interfere with the transmission or reception of a directional transmission between an initiating device and a responding device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Aspects of the disclosure are initially described in the context of a wireless communications system. Aspects of the disclosure are then described in the context of timing diagrams of message flows between an initiating device and a responding device that supports channel reservation techniques for mmW systems. Aspects of the disclosure are further illustrated by and described with reference to apparatus diagrams, system diagrams, and flowcharts that relate to channel reservation techniques for mmW systems.

FIG. 1 shows an example of a wireless communication system 100, in accordance with various aspects of the present disclosure. The wireless communication system 100 may include network access devices 105 (e.g., next generation NodeBs (gNBs) 105-a, ANCs 105-b, and/or RHs 105-c), user equipment (UEs) 115, and a core network 130. The core network 130 may provide user authentication, access authorization, tracking, Internet Protocol (IP) connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a radio head 105-c or distributed across the radio heads 105-c of an gNB 105-a. In another alternative configuration of the wireless communication system 100 (e.g., an LTE/LTE-A configuration), the radio heads 105-c may be replaced with base stations, and the ANCs 105-b may be replaced by base station controllers (or links to the core network 130). In some examples, the wireless communication system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or radio heads 105-c may have similar frame timing, and transmissions from different gNBs 105-a and/or radio heads 105-c may be approximately aligned in time. For asynchronous operation, the gNBs 105-a and/or radio heads 105-c may have different frame timings, and transmissions from different gNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-a, radio heads 105-c, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

Wireless communication system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some examples of the wireless communication system 100, network access devices 105 (e.g., radio heads 105-c) and UEs 115 may include multiple antenna subarrays for employing antenna diversity schemes to improve communication quality and reliability between network access devices 105 and UEs 115. Additionally or alternatively, network access devices 105 and UEs 115 may employ MIMO techniques that may take advantage of multi-path environments to transmit multiple spatial layers carrying the same or different coded data. In some cases, signal processing techniques such as beamforming (e.g., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some examples, a UE 115 may include a communication manager 120. The communication manager 120 may be used to receive a channel reservation request from a second wireless device, such as network access device 105, over a shared radio frequency spectrum band, the channel reservation request including a first expected response time duration for network access device 105 to receive a channel reservation response in response to the channel reservation request. Communication manager 120 may also transmit, during the first expected response time duration, the channel reservation response in response to the received channel reservation request, and receive, from network access device 105, a directional transmission according to the channel reservation request.

In some examples, a network access device 105 may include a communication manager 140. The communication manager 140 may be used to transmit, to a UE 115, a directional channel reservation request on a transmit beam over a shared radio frequency spectrum band, the directional channel reservation request including a first expected response time duration for the network access device 105 to receive a channel reservation response from UE 115 in response to the directional channel reservation request. The communication manager 140 may also receive the channel reservation response from the network access device 105 during the first expected response time duration, and transmit, to network access device 105, a directional transmission according to the directional channel reservation request.

Figure 2:
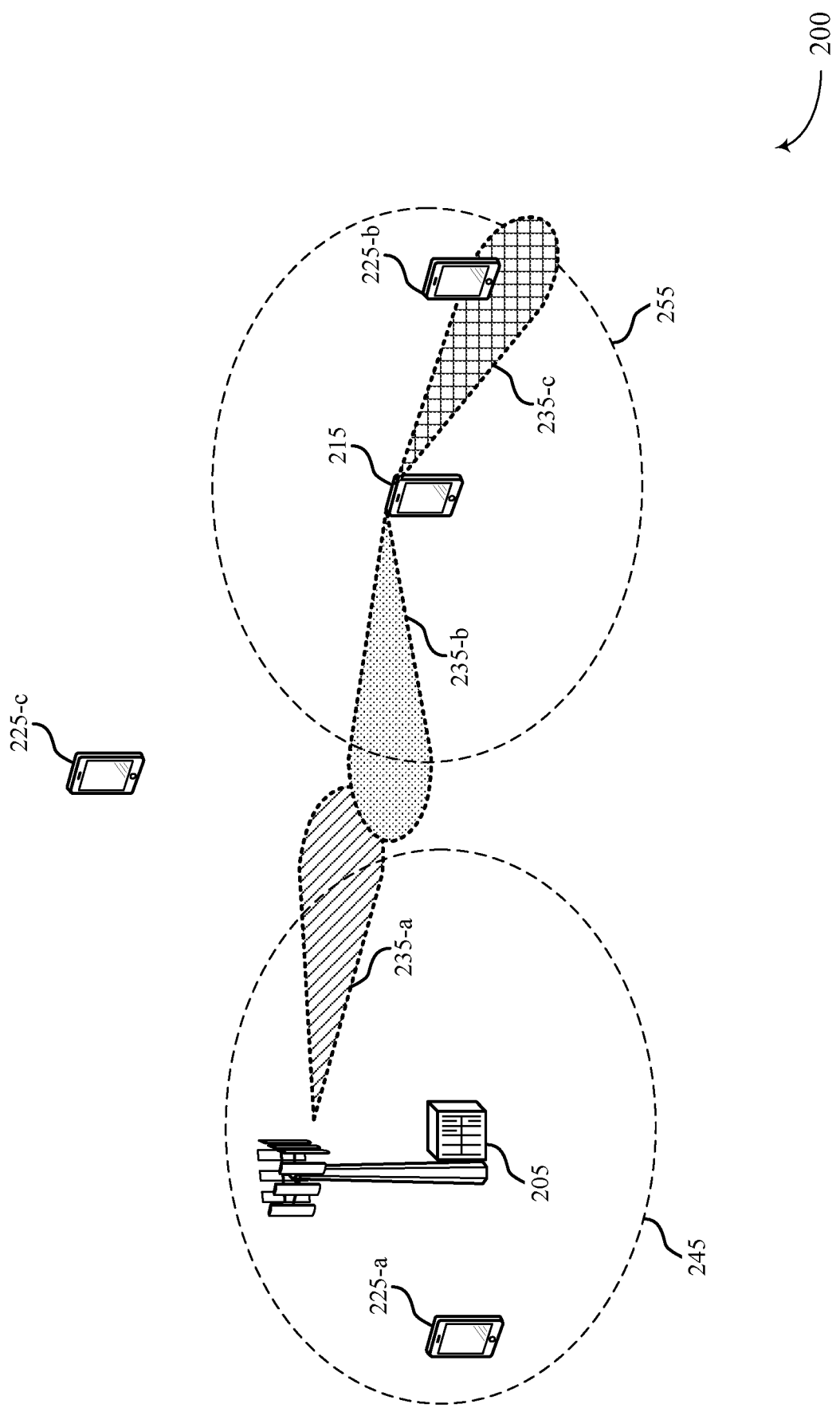
FIG. 2 illustrates an example of a wireless communication system that supports channel reservation techniques for mmW systems in accordance with aspects of the present disclosure.

FIG. 2 illustrates an example of a wireless communication system 200 that supports channel reservation techniques for mmW systems in accordance with various aspects of the present disclosure. The wireless communication system 200 may include a first wireless device 205 and a second wireless device 215. In some examples, the first wireless device 205 can be a network access device (e.g., gNB, ANC, and/or RH). For example, the first wireless device 205 may be a millimeter wave base station (MWB). In some examples, the second wireless device 215 may be a UE. The wireless communication system 200, first wireless device 205, and second wireless device 215 may be examples of aspects of the wireless communication system, network access devices, and UEs described with reference to FIG. 1.

The wireless communication system 200 may also include a number of additional wireless devices 225. The additional wireless devices 225 may be, for example, network access devices, UEs, or a combination thereof.

The first wireless device 205 may communicate with the second wireless device 215 using a wireless medium. In some examples, the wireless medium may be or include shared radio frequency spectrum bands. As used herein, the shared radio frequency spectrum bands may include unlicensed radio frequency spectrum bands. For example, the wireless medium may include the 2.4 GHz frequency band or the 5 GHz frequency band. In other examples, the wireless medium may include licensed radio frequency spectrum bands (e.g., frequency bands licensed to and used by cellular network operators that manage a wireless communication system). In some examples, the wireless medium may include portions of millimeter wave spectrum bands, e.g., radio frequency spectrum bands in a range between 30 GHz and 300 GHz. In some examples, the wireless medium may include frequency bands greater than 20 GHz.

The first wireless device 205 may be configured to transmit in a directional mode, for example in a mode that uses beamforming techniques to focus the transmission signal toward the intended recipient. The directional mode may have an associated first beam 235, which may be a transmit beam when the first wireless device 205 is transmitting, or a receive beam when first wireless device 205 is receiving. In some examples, the first wireless device 205 may have multiple antennas that allow it to use the beamforming techniques for transmitting or receiving. For example, the first wireless device 205 may include an antenna array having two or more antenna elements.

In some examples, the first wireless device 205 may also be configured to transmit or receive in an omnidirectional mode. When transmitting in an omnidirectional mode, transmissions from the first wireless device 205 may be transmitted in all directions, propagating power uniformly in a transmission plane such as the surface of the earth. In some examples, transmissions at a given power level in an omnidirectional mode may have a smaller range than transmissions at the same power level in a directional mode. For example, transmissions from the first wireless device 205 in wireless communication system 200 may be heard by wireless devices within first device omnidirectional range 245. As such, when the first wireless device 205 is transmitting in omnidirectional mode, a transmission from the first wireless device 205 may be received at wireless device 225-a within the first device omnidirectional range 245 but may not be received by a wireless device 225-b or wireless device 225-c that is not within the first device omnidirectional range 245.

The second wireless device 215 may also be configured to transmit or receive in an omnidirectional mode having a second device omnidirectional range 255. For purposes of example, the first device omnidirectional range 245 and the second device omnidirectional range 255 do not overlap in FIG. 2. However, in some examples the first device omnidirectional range 245 and the second device omnidirectional range 255 may overlap. The second wireless device 215 may also be within the first device omnidirectional range 245.

In some examples, the second wireless device 215 may transmit in a directional mode. However, in other examples, the second wireless communication device may be configured to transmit in an omnidirectional mode (e.g., where the second wireless communication device lacks directional mode capabilities).

The first wireless device 205 may make sure that the medium is clear before it attempts to transmit data to the second wireless device 215, for example according to a contention-based protocol. For example, the first wireless device 205 may use a LBT scheme, or a carrier sense multiple access procedure such as the one described in one or more IEEE 802.11 protocols.

Once the first wireless device 205 determines that the medium is clear, the first wireless device 205 may transmit a channel reservation request. The channel reservation request may be a directional channel reservation request, which may be transmitted in a particular direction using beamforming techniques. A second channel reservation request may also be transmitted using an omnidirectional mode. In some examples, the omnidirectional channel reservation request may be an omnidirectional channel reservation request (which may also be referred to herein as a local channel reservation request) having a shorter range than the directional channel reservation request.

The channel reservation request may include an expected response time duration that has a value based on the expected length of time required to receive the corresponding channel reservation response from the second wireless device 215. For example, the expected response time duration may be calculated by summing the expected time needed to transmit any remaining portions of the channel reservation request from the first wireless device 205 to the second wireless device 215, the expected delay between the receipt of the channel reservation request(s) and transmission of the channel reservation response at the second wireless device 215, and the expected time needed to transmit the channel reservation response from the second wireless device 215 to the first wireless device 205. The expected length of time required to receive the corresponding channel reservation response from the second wireless device 215 may exclude the time period during which the data transmission is expected to occur. In some cases, the expected response time duration may be identified as including time durations for the expected transmission of additional control or management signals prior to the data transmissions, such as a second channel reservation request or a second channel reservation response.

The channel reservation request may also include an acknowledgement expected response time duration that has a value based on the expected length of time required to receive, at the first wireless device 205, an acknowledgement from the second wireless device 215. The acknowledgement expected response time duration may include a duration value and an offset value. The duration value may be based on the expected length of time over which the first wireless device 205 is expected to receive an acknowledgement from the second wireless device 215. The offset value may be based on the expected length of time required for the first wireless device 205 to transmit one or more data frames to the second wireless device 215. As such, the inclusion of both an expected response time duration and an acknowledgement expected response time duration may indicate that receiving stations (e.g., wireless device 225-a) should defer from sending any pending transmissions during the period when the first wireless device 205 may receive a channel reservation response from the second wireless device 215, and during the period when the first wireless device 205 may receive an acknowledgement from the second wireless device 215, and may indicate that the receiving stations may transmit during the period when the first wireless device 205 is transmitting the one or more data frames to the second wireless device 215. The expected response time duration for the channel reservation response and the expected response time duration for the acknowledgment may indicate that the receiving stations may transmit when the first wireless device 205 is transmitting the one or more data frames by omitting, from the expected response time durations, those time durations where the first wireless device 205 is expected to be transmitting data.

In some examples, the first wireless device 205 may transmit multiple channel reservation requests, each of which may include one or more expected response time durations. For example, the channel reservation request may include an omnidirectional channel reservation request (e.g., a local channel reservation request) with a first expected response time duration and a directional channel reservation request with a second expected response time duration. In some examples, the omnidirectional channel reservation request may be transmitted prior to the directional channel reservation request, and the value of the first expected response time duration may be larger than the value of the second expected response time duration. In other examples, the directional channel reservation request may be transmitted prior to the omnidirectional channel reservation request, and the value of the second expected response time duration may be larger than the value of the first expected response time duration.

In some examples, the channel reservation request may include a Request-to-Send (RTS) frame such as the RTS frame described in connection with one or more IEEE 802.11 protocols. In such examples, the expected response time duration may be located in the duration data field of the RTS frame. The channel reservation request may be transmitted in accordance with a first modulation and coding scheme (MCS). The first MCS may be a low MCS index, for example phase shift keying (PSK) with a low coding rate, such as binary phase shift keying (BPSK).

The channel reservation request may include information about whether the channel reservation request is an omnidirectional (e.g., local) channel reservation request or a directional channel reservation request. For example, the channel reservation request may include a transmission mode indicator with a bit value of '1' when the channel reservation request is an omnidirectional channel reservation request and a bit value of '0' when the channel reservation request is a directional channel reservation request. In some examples, each frame of the channel reservation request may include a transmission mode indicator such that one or more frames may be designated as the omnidirectional channel reservation request and one or more other frames may be designated as the directional channel reservation request.

Upon receiving the channel reservation request, the second wireless device 215 may determine whether it is the intended recipient. The second wireless device 215 may, for example, determine that an identifier related to the second wireless device 215 is included in the channel reservation request (e.g., the address of the second wireless device 215 may be included in a destination address field of the channel reservation request).

The second wireless device 215 may then respond to the channel reservation request by transmitting one or more channel reservation responses. In some examples, each of the channel reservation responses may be transmitted in a frame. The channel reservation responses may be transmitted in an omnidirectional mode or a directional mode, or some channel reservation responses may transmitted in an omnidirectional mode while other of the channel reservation responses may transmitted in a directional mode.

In some examples, the channel reservation responses may include two channel reservation responses. For example, the channel reservation response may include a directional channel reservation response and an omnidirectional channel reservation response. The directional channel reservation response may be directed toward the first wireless device 205 and transmitted in a directional mode. The omnidirectional channel reservation response may be transmitted in an omnidirectional mode.

In some examples, the channel reservation responses may include multiple directional channel reservation responses. The second wireless device 215 may have a list of dominant jamming stations. The list of dominant jamming stations may include, for example, wireless device 225-*b*. The channel reservation response may include a first directional channel reservation response and a second directional channel reservation response. The first directional channel reservation response may be directed to the first wireless device 205 and transmitted in a directional mode, for example using beam 235-*b*. The second directional channel reservation response may be directed to the wireless device 225-*b* and transmitted in a directional mode, for example using another beam, beam 235-*c*. The channel reservation response may also include additional directional reservation responses directed at other wireless communication devices, for example other wireless communication devices on the list of dominant jamming stations.

The channel reservation response may include an expected response time duration having a value based on the expected length of time to receive one or more data frames from the first wireless device 205. For example, the value of the expected response time duration may be calculated by summing the expected time needed to transmit any remaining portions of the channel reservation response from the second wireless device 215 to the first wireless device 205, the expected delay between receipt of the channel reservation response(s) and transmission of one or more data frames at the first wireless device 205, and the expected length of time needed to transmit the one or more data frames from the first wireless device 205 to the second wireless device 215. The value of the expected response time duration may also cover the expected length of time needed to receive an acknowledgement request from the first wireless device 205 or the expected length of time needed to transmit an acknowledgement from the second wireless device 215 to the first wireless device 205, where applicable.

In some examples, the channel reservation response may include multiple expected response time durations. For example, the channel reservation response may include an omnidirectional channel reservation response having a first expected response time duration and a directional channel reservation response having a second expected response time duration.

In some examples, the channel reservation response may include a Clear-to-Send (CTS) frame such as a CTS frame as described in connection with one or more IEEE 802.11 protocols. The channel reservation request may be transmitted in accordance with a low MCS index, for example an MCS index indicating BPSK.

The channel reservation response may include information about whether the channel reservation response is an omnidirectional channel reservation response or a directional channel reservation response. For example, the channel reservation response may include a transmission mode indicator with a value of '1' when the channel reservation response is an omnidirectional channel reservation response and a value of '0' when the channel reservation response is a directional channel reservation response. In some examples, each frame of the channel reservation response may include a transmission mode indicator such that one or more frames may be designated as the omnidirectional channel reservation response and one or more other frames may be designated as the directional channel reservation response.

After receiving a channel reservation response from the second wireless device 215, the first wireless device 205 may transmit one or more data frames. The one or more data frames may be transmitted in a directional mode, where the first wireless device 205 may transmit the data frames using a transmit beam 235-*a*, and the second wireless device 215 may receive the data frames using a receive beam 235-*b*. The data frames may be transmitted according to a second MCS, the index of which may be higher than the MCS index used for the transmission of the channel reservation request or the channel reservation response, or both. Further, the data frames may be transmitted in a different direction, or according to a different transmit beam, than the channel reservation response, for example in a different directional mode.

The first wireless device 205 may also transmit an acknowledgement expected response time duration to provide protection for an acknowledgement to be sent by the second wireless device 215 in response to a directional transmission. The acknowledgement expected response time duration may have a value based on the expected length of time to receive an acknowledgement from the second wireless device 215 following the directional transmission. For example, the value of the acknowledgement expected response time duration may be calculated using the sum of the expected delay from receiving the directional transmission to transmitting the acknowledgement from the second wireless device 215 to the first wireless device 205. In some examples, the expected delay may be impacted by the value of the expected response time duration included in the channel reservation request, because the second wireless device 215 may not be able to transmit a directional transmission (e.g., a directional data transmission) until the length of time specified in the expected response time duration has lapsed.

The various messages communicated between the first wireless device 205 and second wireless device 215 may also be received by one or more of the additional wireless devices 225. In particular, the additional wireless devices 225 may receive one or more of a channel reservation request (such as an omnidirectional channel reservation request or a directional channel reservation request), a channel reservation response (such as an omnidirectional channel reservation response, a directional channel reservation response directed to the first wireless device 205 and received by the additional wireless device 225, or a directional channel reservation response directed to a dominant jamming station, e.g., wireless device 225-*c*), or an acknowledgement (which may be transmitted directionally or omnidirectionally). Upon receiving such messages, the additional wireless devices 225 may be configured to defer pending transmissions for the expected response time duration set forth in the received messages (e.g., the channel reservation response expected response time duration of one or more of the channel reservation request or the channel reservation response, or an acknowledgement expected response time duration). Upon receiving one or more of the channel reservation messages, the wireless devices 225 may determine whether the channel reservation message is an omnidirectional reservation message (e.g., an omnidirectional channel reservation request or an omnidirectional channel reservation response) or a directional reservation message (e.g., a directional channel reservation request or a directional channel reservation response). For example, the wireless devices 225 may determine whether the channel reservation message is an omnidirectional reservation message or a directional reservation message by checking a transmission mode indicator in the message.

In some examples, an acknowledgement may be transmitted by the second wireless device 215 to the first wireless device 205 using beamforming, for example on a transmit beam, and the second wireless device 215 may receive the acknowledgement omnidirectionally. In other cases, the acknowledgement may be transmitted by the second wireless device 215 omnidirectionally, without using beamforming, and the first wireless device 205 may use beamforming to receive the acknowledgement, for example using a receive beam. In other examples, both a transmit beam may be used by the second wireless device 215 to transmit the acknowledgement, and a receive beam may be used by the first wireless device 205 to receive the acknowledgement.

In some examples, the wireless devices 225 may be configured to defer pending transmissions if the channel reservation message is an omnidirectional reservation message. In such examples, the wireless devices 225 may ignore directional reservation messages. In other examples, the wireless devices 225 may be configured to defer pending transmissions if a directional reservation message is directed to the wireless communication device (e.g., in the case of a directional channel reservation response directed to a dominant jamming device). In such examples, after determining that the message is a directional reservation message, the wireless devices 225 may determine whether the message is directed to that station (e.g., by checking a destination address field in the message), and may ignore any directional messages that are not so directed.

In some examples, the wireless devices 225 may determine whether the signal strength of the received channel reservation message satisfies a signal strength threshold. For example, the wireless devices 225 may compare the signal strength of the received message to a signal strength threshold and ignore the message if the signal strength is lower than the signal strength threshold. In some cases, omnidirectional reservation messages above a signal strength threshold may cause the wireless devices 225 to defer from transmitting.

If all of the prerequisites are met, the wireless devices 225 may set a deferral timer (e.g., a network allocation vector (NAV)) based on the value of the expected response time durations included in the message (e.g., the channel reservation response expected response time duration or the acknowledgement expected response time duration). For example, the wireless devices 225 may extract the value for the expected response time duration from the channel reservation message and set the deferral timer to that value. In other examples, the wireless devices 225 may compare the value of the extracted expected response time duration to the current value of the deferral timer and set the deferral timer to the value of the extracted expected response time duration if the value of the extracted expected response time duration is higher than the value of the current deferral timer. The wireless devices 225 may then refrain from transmitting their pending transmissions until the deferral timer expires.

In some cases, the wireless devices 225 may receive a channel reservation message having a channel reservation response expected response time duration and an acknowledgement expected response time duration. The wireless devices 225 may set three or more timers: two deferral timers (corresponding to the value of the channel reservation response expected response time duration and the value of the acknowledgement expected response time duration) and an offset timer (corresponding to the value of the offset field of the acknowledgement expected response time duration). The wireless devices 225 may then refrain from transmitting their pending transmissions when the two deferral timers are running, but may transmit their pending transmissions when the offset timer is running.

Figure 3:
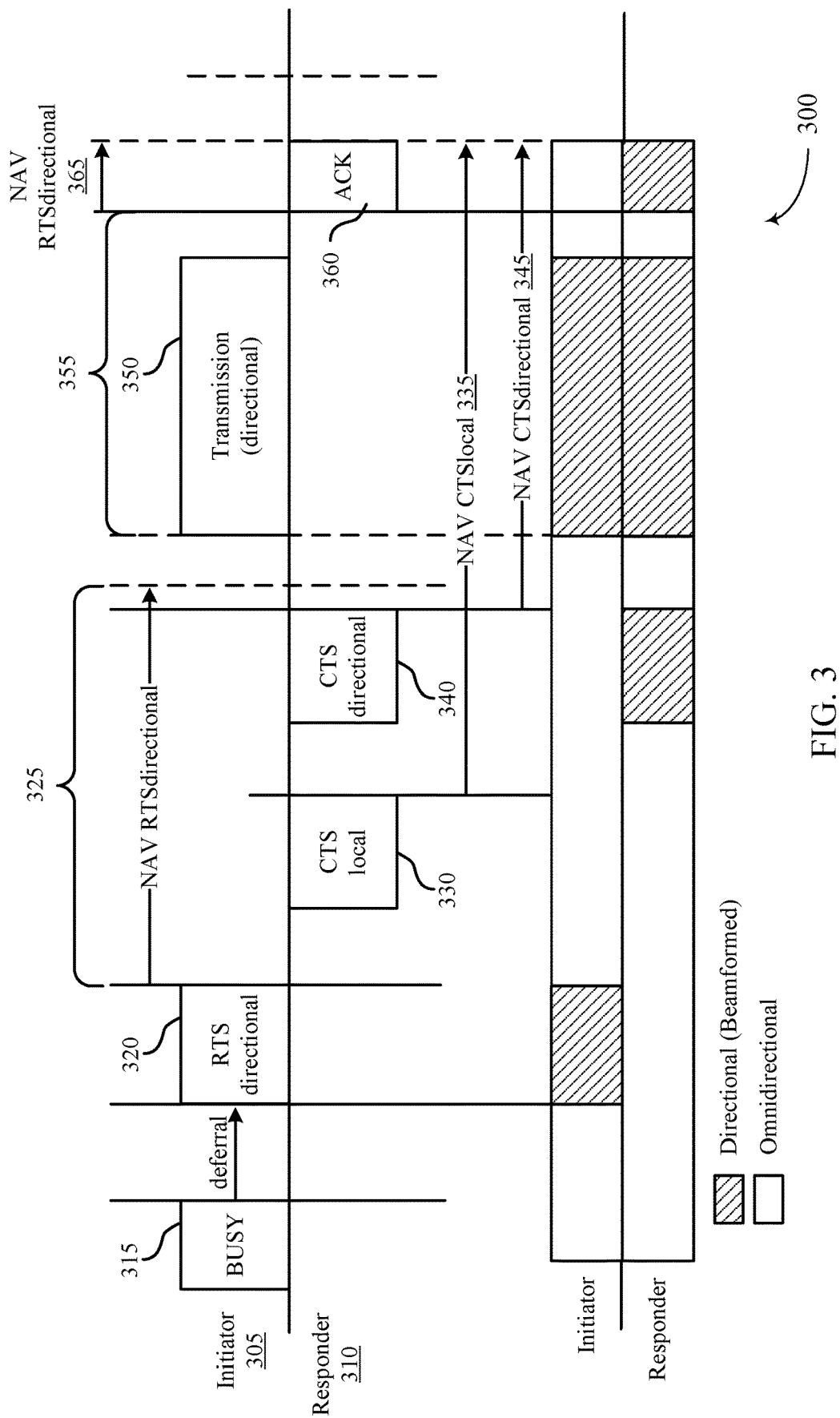
FIG. 3 through 8 illustrates examples of timing diagrams of message flows between an initiating device and a responding device that supports channel reservation techniques for mmW systems in accordance with aspects of the present disclosure.

FIG. 3 illustrates an example of a message flow diagram 300 that supports channel reservation techniques for mmW systems in accordance with various aspects of the present disclosure. The message flow diagram 300 includes an initiating device message flow 305 (initiator) and a responding device message flow 310 (responder). The initiating device and responding device may be examples of aspects of the first wireless device 205 and second wireless device 215 described with reference to FIG. 2.

The message flow diagram 300 may begin when an initiating device has data to transmit to a responding device. In some examples, a third party signal 315 may be present on the wireless medium. In such cases, the initiating device may wait until the wireless medium is clear.

The initiating device may then transmit a channel reservation request 320. The channel reservation request may be transmitted in a directional mode, e.g., by using beamforming techniques. The channel reservation request may include a single frame such as a RTS frame. The channel reservation request may be transmitted in accordance with a first MCS, which may be a lower MCS index than data transmissions to provide for increased range. The channel reservation request may include a value based on the channel reservation response timeout 325. The channel reservation response timeout 325 may be calculated based on an expected response time duration indicating the expected length of time needed to receive the channel reservation response from the responding device.

With the exception of the responding device, all stations that receive the channel reservation request 320 may defer from transmitting during the channel reservation response timeout 325.

The responding device may respond to the channel reservation request by transmitting an omnidirectional channel reservation response 330. The omnidirectional channel reservation response 330 may be transmitted in an omnidirectional mode. The omnidirectional channel reservation response 330 may be, for example, a CTS frame. The channel reservation response may be transmitted in accordance with the first MCS. The omnidirectional channel reservation response may include a value based on the omnidirectional channel reservation timeout 335. The omnidirectional channel reservation timeout 335 may be calculated based on an expected response time duration indicating the expected length of time needed to receive one or more data frames from the initiating device. The omnidirectional channel reservation timeout 335 may also include the expected length of time needed to receive an acknowledgement from the responding device at the initiating device.

The omnidirectional channel reservation response 330 may also include an indication that it is an omnidirectional channel reservation response. For example, the omnidirectional channel reservation response 330 may include a transmission mode indicator.

The responding device may also transmit a directional channel reservation response 340. The directional channel reservation response 340 may be transmitted in a directional mode, e.g., by using beamforming techniques. The directional channel reservation response 340 may be, for example, a CTS frame. The directional channel reservation response may be transmitted in accordance with the first MCS, which may be a lower MCS index than data transmissions to provide for increased signal range, or a second MCS different than the first MCS. The directional channel reservation response 340 may include a value based on the directional channel reservation timeout 345. The directional channel reservation timeout 345 may be calculated based on an expected response time duration indicating the expected length of time needed to receive one or more data frames from the initiating device. The directional channel reservation timeout 345 may also include the expected length of time needed to receive an acknowledgement, from the responding device, at the initiating device. However, the directional channel reservation timeout 345 may be shorter than the omnidirectional channel reservation timeout 335 because it may not need to account for the time needed to transmit the directional channel reservation response 340. In other examples, the directional channel reservation response may be transmitted prior to the omnidirectional channel reservation response and the expected response time duration for the directional channel reservation may be longer (with the same directional channel reservation timeout) than the omnidirectional channel reservation timeout.

The directional channel reservation response 340 may also include an indication that it is a directional channel reservation response. For example, the directional channel reservation response 340 may include a transmission mode indicator.

In some examples, each of the stations (except the initiating device) that receives either the omnidirectional channel reservation response 330 or the directional channel reservation response 340 may defer from transmitting during the time period corresponding to the omnidirectional channel reservation timeout 335 and/or the directional channel reservation timeout 345 (e.g., by setting the station's NAV). In other examples, one or more of the stations that receive the omnidirectional channel reservation response 330 may defer from transmitting during the time period corresponding to the omnidirectional channel reservation timeout 335, while other stations that receive the directional channel reservation response 340 may initiate transmissions during the time period corresponding to the directional channel reservation timeout 345.

In some examples, a station that receives a channel reservation response such as omnidirectional channel reservation response 330 or directional channel reservation response 340 may defer from transmitting during the associated time periods if the signal strength of the received channel reservation response is greater than a threshold signal strength value. For example, a station such as wireless device 225-b of FIG. 2 may defer from transmitting if (1) the station receives an omnidirectional channel reservation response 330 and (2) the signal strength of the omnidirectional channel reservation response 330 is greater than a threshold signal strength value.

The initiating device may then transmit one or more data frames 350. The one or more data frames 350 may be transmitted in a directional mode, e.g., by using beamforming techniques. The one or more data frames may be transmitted in accordance with a second MCS that may be different than the first MCS. In some examples, the first MCS may be a low rate MCS and the second MCS may be a high rate MCS. For example, the first MCS may be complementary code keying (CCK) and the second MCS may be OFDM.

The one or more data frames are transmitted during the data transmission time period 355. All stations that may interfere with the receipt of the one or more data frames 350 at the responding device may be prevented from transmitting during the data transmission time period 355 based on the receipt of the omnidirectional channel reservation response 330 and/or the directional channel reservation response 340. Meanwhile, stations in the vicinity of the initiating device whose transmissions may not interfere with receipt of the one or more data frames 350 may initiate transmissions during the data transmission time period 355.

After receiving the one or more data frames 350, the responding device may transmit an acknowledgement 360 to the initiating device to indicate that the one or more data frames 350 were successfully received. The acknowledgement 360 may be, for example, an acknowledgement (ACK) frame or a block acknowledgement (BA) frame. The acknowledgement 360 may be transmitted in accordance with the first MCS or the second MCS. In some examples, acknowledgement 360 may be transmitted on a transmit beam.

In some examples, the channel reservation request 320 may include a field protecting the transmission of the acknowledgement 360. For example, the channel reservation request 320 may include an expected response time duration value based on the acknowledgement timeout 365 and an offset value based on the data transmission time period 355, such that the acknowledgement timeout 365 would start when or after the data transmission time period 355 has lapsed.

Figure 4:
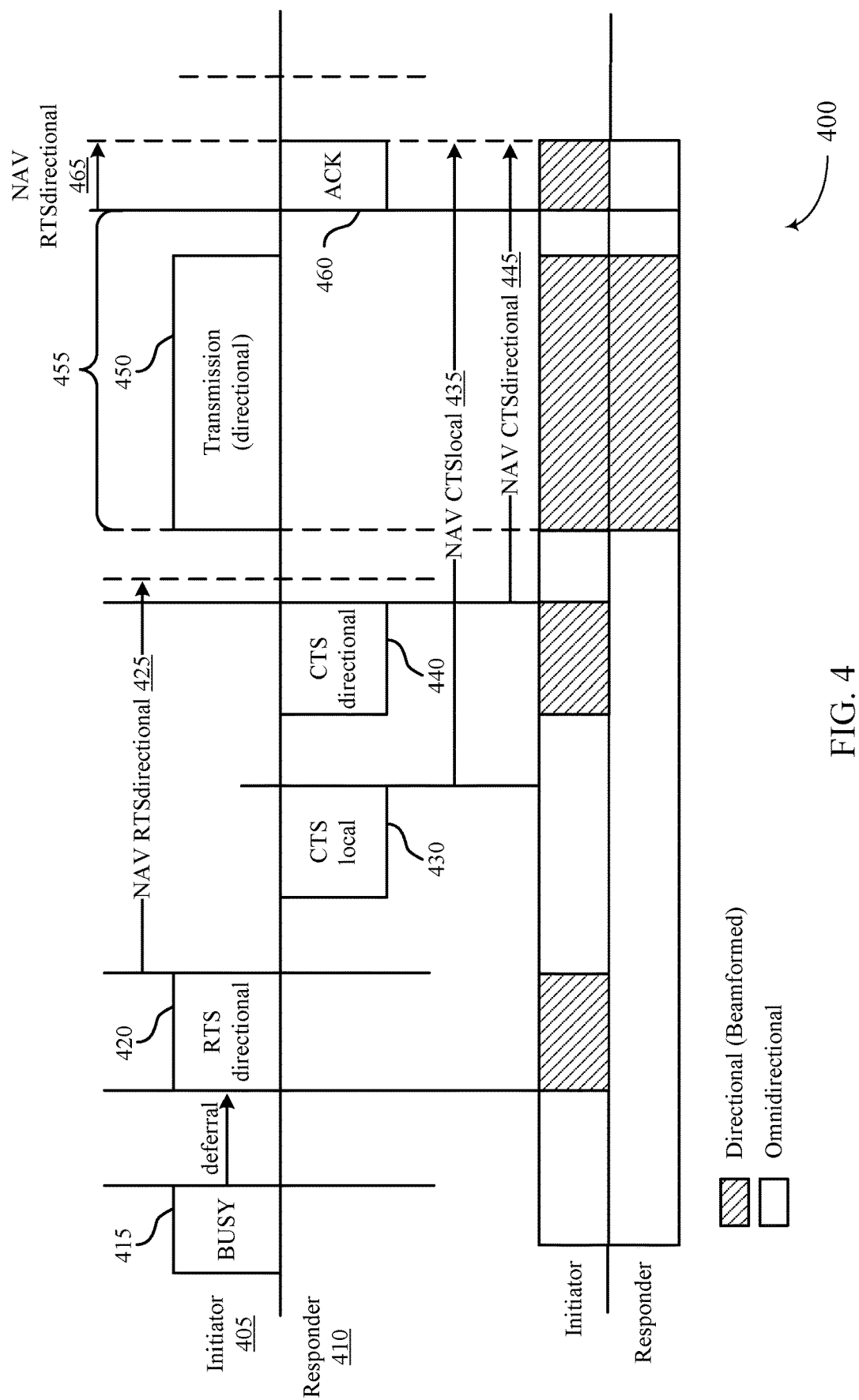

FIG. 4 illustrates an example of a message flow diagram 400 that supports channel reservation techniques for mmW systems in accordance with various aspects of the present disclosure. The message flow diagram 400 includes an initiating device message flow 405 and a responding device message flow 410. The initiating device and responding device may be examples of aspects of the first wireless device 205 and second wireless device 215 described with reference to FIG. 2. In the example shown in FIG. 4, the responding device may not transmit a channel reservation response (e.g., omnidirectional channel reservation response 430 or directional channel reservation response 440), or acknowledgement 460 in a directional mode.

The message flow diagram 400 may begin when an initiating device has data to transmit to a responding device. In some examples, a third party signal 415 may be present on the wireless medium. In such cases, the initiating device may wait until the wireless medium is clear.

The initiating device may then transmit a channel reservation request 420. The channel reservation request may be transmitted in a directional mode, e.g., by using beamforming techniques. The channel reservation request may include a single frame such as a RTS frame. The channel reservation request may be transmitted in accordance with a first MCS, which may be a lower MCS index than data transmissions to provide for increased range. The channel reservation request may include a value based on the channel reservation response timeout 425. The channel reservation response timeout 425 may be calculated based on an expected response time duration indicating the expected length of time needed to receive the channel reservation response from the responding device.

Excluding the responding device, stations that receive the channel reservation request 420 may defer from transmitting during the channel reservation response timeout 425.

The responding device may respond to the channel reservation request by transmitting an omnidirectional channel reservation response 430. The omnidirectional channel reservation response 430 may be transmitted in an omnidirectional mode. The omnidirectional channel reservation response 430 may be, for example, a CTS frame. The omnidirectional channel reservation response may be transmitted in accordance with the first MCS, which may be a lower MCS index than data transmissions to provide for increased signal range, or a second MCS different than the first MCS. The omnidirectional channel reservation response may include a value based on the omnidirectional channel reservation timeout 435. The omnidirectional channel reservation timeout 435 may be calculated based on an expected response time duration indicating the expected length of time needed to receive one or more data frames from the initiating device. The omnidirectional channel reservation timeout 435 may also include the expected length of time needed to transmit an acknowledgement to the initiating device.

The omnidirectional channel reservation response 430 may also include an indication that it is an omnidirectional channel reservation response. For example, the omnidirectional channel reservation response 430 response may include a transmission mode indicator.

The responding device may also transmit a directional channel reservation response 440. The directional channel reservation response 440 may be transmitted in an omnidirectional mode. The directional channel reservation response 440 may be, for example, a CTS frame. The directional channel reservation response 440 may be transmitted in accordance with the first MCS. The directional channel reservation response 440 may include a value based on the directional channel reservation timeout 445. The directional channel reservation timeout 445 may be calculated based on an expected response time duration indicating the expected length of time needed to receive one or more data frames from the initiating device. The directional channel reservation timeout 445 may also include the expected length of time needed to transmit an acknowledgement to the initiating device. However, the directional channel reservation timeout 445 may be shorter than the omnidirectional channel reservation timeout 435 because it may not need to account for the time needed to transmit the directional channel reservation response 440. In other examples, the directional channel reservation response 440 may be transmitted prior to the omnidirectional channel reservation response 430 and the expected response time duration for the directional channel reservation response 440 may be longer (with the same directional channel reservation timeout) than the omnidirectional channel reservation timeout.

The directional channel reservation response 440 may also include an indication that it is a directional channel reservation response. For example, the directional channel reservation response 440 may include a transmission mode indicator.

In some examples, all stations (except the initiating device) that receive either the omnidirectional channel reservation response 430 or the directional channel reservation response 440 may defer from transmitting during the time period corresponding to the omnidirectional channel reservation timeout 435 and/or the directional channel reservation timeout 445 (e.g., by setting the station's NAV). In other examples, stations that receive the omnidirectional channel reservation response 430 may defer from transmitting during the time period corresponding to the omnidirectional channel reservation timeout 435, while other stations that receive the directional channel reservation response 440 may initiate transmissions during the time period corresponding to the directional channel reservation timeout 445.

In some examples, a station that receives a channel reservation response such as omnidirectional channel reservation response 430 or directional channel reservation response 440 may defer from transmitting during the associated time periods if the signal strength of the received channel reservation response is greater than a threshold signal strength value. For example, a station such as wireless device 225-b of FIG. 2 may defer from transmitting if (1) the station receives an omnidirectional channel reservation response 430 and (2) the signal strength of the omnidirectional channel reservation response 430 is greater than a threshold signal strength value.

The initiating device may then transmit one or more data frames 450. The one or more data frames 450 may be transmitted in a directional mode, e.g., by using beamforming techniques. The one or more data frames 450 may be transmitted in accordance with a second MCS that may be different than the first MCS. In some examples, the first MCS may be a low rate MCS and the second MCS may be a high rate MCS. For example, the first MCS may be CCK and the second MCS may be OFDM.

The one or more data frames may be transmitted during the data transmission time period 455. All stations that may interfere with the receipt of the one or more data frames 450 at the responding device may be prevented from transmitting during the data transmission time period 455 based on the receipt of the omnidirectional channel reservation response 430 and/or the directional channel reservation response 440. Meanwhile, stations in the vicinity of the initiating device whose transmissions may not interfere with receipt of the one or more data frames 450 may initiate transmissions during the data transmission time period 455.

After receiving the one or more data frames 450, the responding device may transmit an acknowledgement 460 to the initiating device to indicate that the one or more data frames 450 were successfully received. The acknowledgement 460 may be, for example, an ACK frame or a BA frame. The acknowledgement 460 may be transmitted in accordance with the first MCS or the second MCS. In some examples, acknowledgement 460 may be transmitted omnidirectionally from the responder, and received directionally by the initiator using a receive beam.

In some examples, the channel reservation request 420 may include a field protecting the transmission of the acknowledgement 460. For example, the channel reservation request 420 may include a duration value based on the acknowledgement timeout 465 and an offset value based on the data transmission time period 455, such that the acknowledgement timeout 465 would start after the data transmission time period 455 has lapsed.

Figure 5:
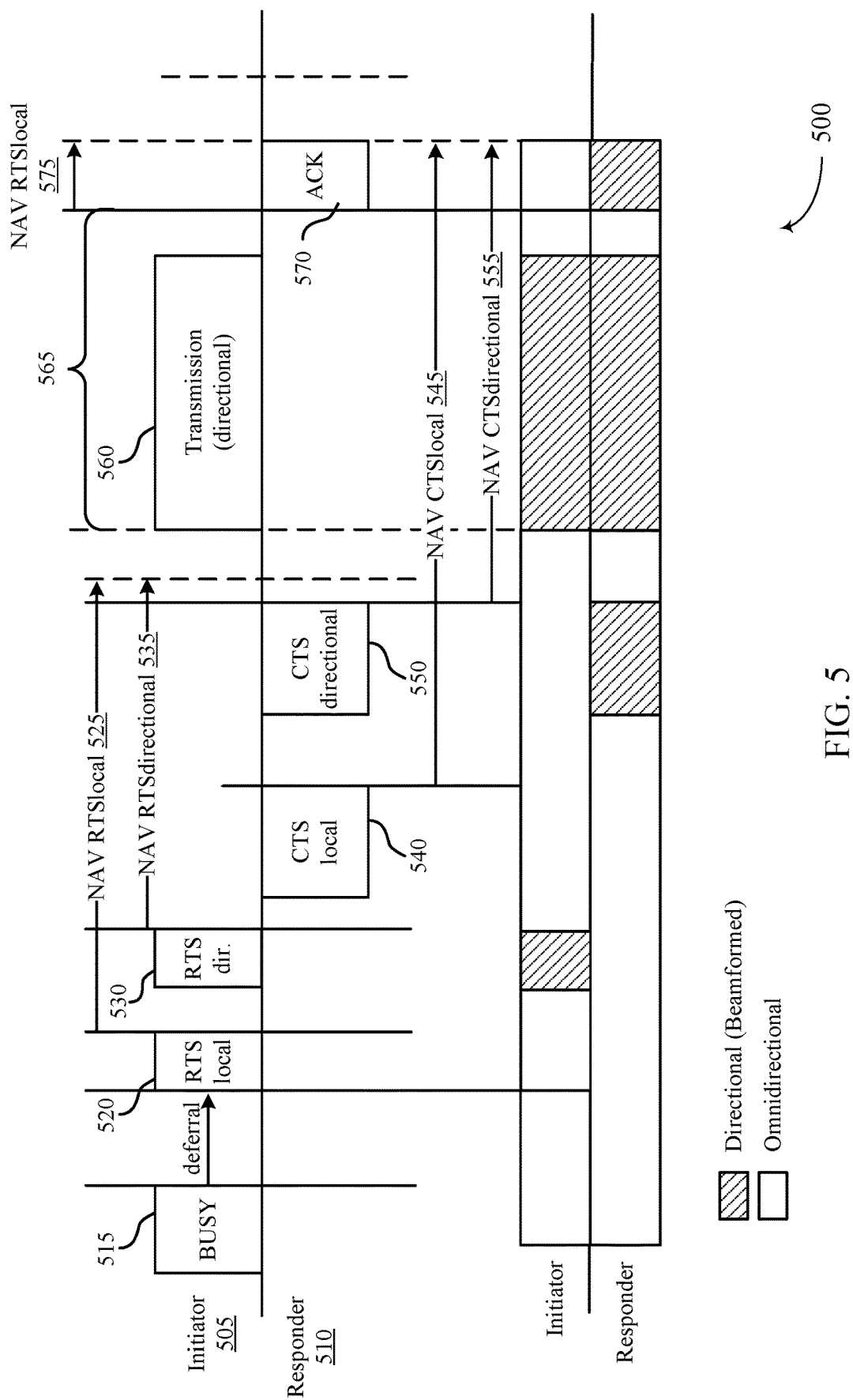

FIG. 5 illustrates an example of a message flow diagram 500 that supports channel reservation techniques for mmW systems in accordance with various aspects of the present disclosure. The message flow diagram 500 includes an initiating device message flow 505 and a responding device message flow 510. The initiating device and responding device may be examples of aspects of the first wireless communication device and second wireless communication device described with reference to FIG. 2.

The message flow diagram 500 may begin when an initiating device has data to transmit to a responding device. In some examples, a third party signal 515 may be present on the wireless medium. In such cases, the initiating device may wait until the wireless medium is clear.

The initiating device may then transmit an omnidirectional channel reservation request 520. The omnidirectional channel reservation request 520 may be transmitted in an omnidirectional mode. The omnidirectional channel reservation request 520 may be, for example, a RTS frame. The omnidirectional channel reservation request 520 may be transmitted in accordance with a first MCS. The omnidirectional channel reservation request 520 may include a value based on the omnidirectional channel reservation response timeout 525. The omnidirectional channel reservation response timeout 525 may be calculated based on an expected response time duration indicating the expected length of time needed to receive the channel reservation response from the responding device.

The omnidirectional channel reservation request 520 may include an indication that it is an omnidirectional channel reservation response. For example, the omnidirectional channel reservation request 520 may include a transmission mode indicator.

The initiating device may also transmit a directional channel reservation request 530. The directional channel reservation request 530 may be transmitted in a directional mode, e.g., by using beamforming techniques. The directional channel reservation request 530 may be, for example, a RTS frame. The directional channel reservation request 530 may be transmitted in accordance with the first MCS. The directional channel reservation request 530 may include a value based on the directional channel reservation response timeout 535. The directional channel reservation response timeout 535 may be calculated based on an expected response time duration indicating the expected length of time needed to receive the channel reservation response from the responding device. The directional channel reservation response timeout 535 may be shorter than the omnidirectional channel reservation response timeout 525 because it may not need to account for the time needed to transmit the directional channel reservation response 550. In other examples, the directional channel reservation request may be transmitted prior to the omnidirectional channel reservation request and the directional channel reservation response timeout may be longer than the omnidirectional channel reservation response timeout.

The directional channel reservation request 530 may also include an indication that it is a directional channel reservation request. For example, the directional channel reservation request 530 may include a transmission mode indicator.

With the exception of the responding device, all stations that receive the omnidirectional channel reservation request 520 and/or the directional channel reservation request 530 may defer from transmitting during the time period corresponding to the omnidirectional channel reservation response timeout 525 or the directional channel reservation response timeout 535. In other examples, stations that receive the omnidirectional channel reservation request 520 may defer from transmitting during the time period corresponding to the omnidirectional channel reservation response timeout 525, while stations that receive the directional channel reservation request 530 may initiate transmissions during the time period corresponding to the directional channel reservation response timeout 535.

In some examples, a station that receives a channel reservation request such as omnidirectional channel reservation request 520 or directional channel reservation request 530 may defer from transmitting during the associated time periods if the signal strength of the received channel reservation request is greater than a threshold signal strength value. For example, a station such as wireless device 225-*a* of FIG. 2 may defer from transmitting if (1) the station receives an omnidirectional channel reservation request 520 and (2) the signal strength of the omnidirectional channel reservation request 520 is greater than a threshold signal strength value.

The responding device may respond to the channel reservation request by transmitting an omnidirectional channel reservation response 540. The omnidirectional channel reservation response 540 may be transmitted in an omnidirectional mode. The omnidirectional channel reservation response 540 may be, for example, a CTS frame. The omnidirectional channel reservation response 540 may be transmitted in accordance with the first MCS. The omnidirectional channel reservation response may include a value based on the omnidirectional channel reservation timeout 545. The omnidirectional channel reservation timeout 545 may be calculated based on the expected length of time needed to receive one or more data frames from the initiating device. The omnidirectional channel reservation timeout 545 may also include the expected length of time needed to transmit an acknowledgement to the initiating device.

The omnidirectional channel reservation response 540 may also include an indication that it is an omnidirectional channel reservation response. For example, the omnidirectional channel reservation response 540 may include a transmission mode indicator.

The responding device may also transmit a directional channel reservation response 550. The directional channel reservation response 550 may be transmitted in an omnidirectional mode. The directional channel reservation response 550 may be, for example, a CTS frame. The directional channel reservation response 550 may be transmitted in accordance with the first MCS. The directional channel reservation response 550 may include a value based on the directional channel reservation timeout 555. The directional channel reservation timeout 555 may be calculated based on an expected response time duration indicating the expected length of time needed to receive one or more data frames from the initiating device. The directional channel reservation timeout 555 may also include the expected length of time needed to transmit an acknowledgement to the initiating device. However, the directional channel reservation timeout 555 may be shorter than the omnidirectional channel reservation timeout 545 because it may not need to account for the time needed to transmit the directional channel reservation response 550. In other examples, the directional channel reservation response may be transmitted prior to the omnidirectional channel reservation response and the directional channel reservation timeout may be longer than the omnidirectional channel reservation timeout.

The directional channel reservation response 550 may also include an indication that it is a directional channel reservation response. For example, the directional channel reservation response 550 may include a transmission mode indicator.

In some examples, all stations (except the initiating device) that receive either the omnidirectional channel reservation response 540 or the directional channel reservation response 550 may defer from transmitting during the time period corresponding to the omnidirectional channel reservation timeout 545 and/or the directional channel reservation timeout 555 (e.g., by setting the station's NAV). In other examples, stations that receive the omnidirectional channel reservation response 540 may defer from transmitting during the time period corresponding to the omnidirectional channel reservation timeout 545, while stations that receive the directional channel reservation response 550 may initiate transmissions during the time period corresponding to the directional channel reservation timeout 555.

In some examples, a station that receives a channel reservation response such as omnidirectional channel reservation response 540 or directional channel reservation response 550 may defer from transmitting during the associated time periods if the signal strength of the receive channel reservation response is greater than a threshold signal strength value. For example, a station such as wireless device 225-*b* of FIG. 2 may defer from transmitting if (1) the station receives an omnidirectional channel reservation response 540 and (2) the signal strength of the omnidirectional channel reservation response 540 is greater than a threshold signal strength value.

The initiating device may then transmit one or more data frames 560. The one or more data frames 560 may be transmitted in a directional mode, e.g., by using beamforming techniques. The one or more data frames 560 may be transmitted in accordance with a second MCS that may be different than the first MCS. In some examples, the first MCS may be a low rate MCS and the second MCS may be a high rate MCS. For example, the first MCS may be CCK and the second MCS may be OFDM.

The one or more data frames are transmitted during the data transmission time period 565. All stations that may interfere with the receipt of the one or more data frames 560 at the responding device may be prevented from transmitting during the data transmission time period 565 based on the receipt of the omnidirectional channel reservation response 540 and/or the directional channel reservation response 550. Meanwhile, stations in the vicinity of the initiating device whose transmissions will not interfere with receipt of the one or more data frames 560 may be free to initiate transmissions during the data transmission time period 565.

After receiving the one or more data frames 560, the responding device may transmit an acknowledgement 570 to the initiating device to indicate that the one or more data frames 560 were successfully received. The acknowledgement 570 may be, for example, an ACK frame or a BA frame. The acknowledgement 570 may be transmitted in accordance with the first MCS or the second MCS. In some examples, acknowledgement 570 may be transmitted directionally from the responder using a transmit beam.

In some examples, the omnidirectional channel reservation request 520 and/or the directional channel reservation request 530 may include a field protecting the transmission of the acknowledgement 570. For example, the omnidirectional channel reservation request 520 may include a duration value based on the acknowledgement timeout 575 and an offset value based on the data transmission time period 565, such that the acknowledgement timeout 575 would start after the data transmission time period 565 has lapsed.

Figure 6:
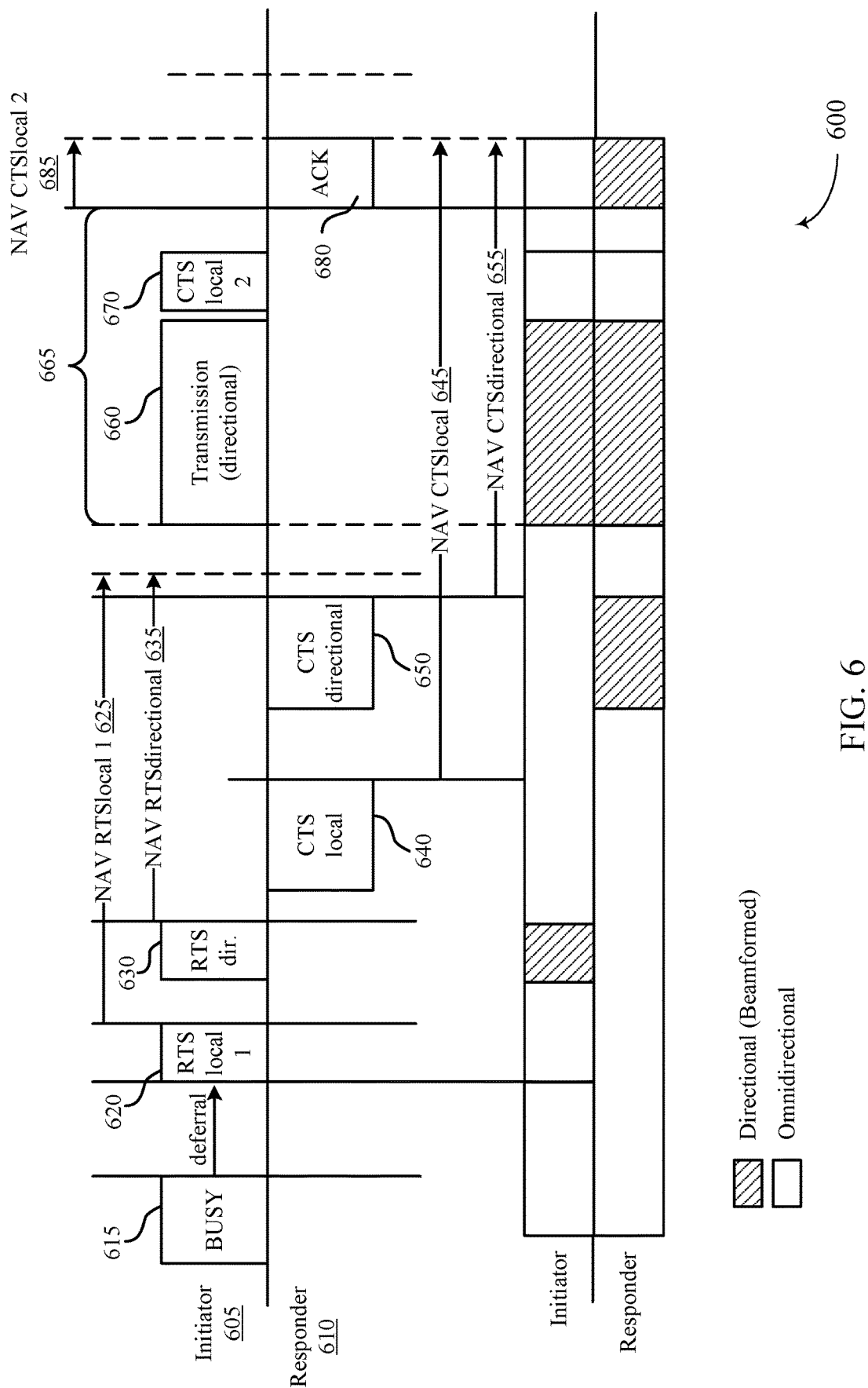

FIG. 6 illustrates an example of a message flow diagram 600 that supports channel reservation techniques for mmW systems in accordance with various aspects of the present disclosure. The message flow diagram 600 includes an initiating device message flow 605 and a responding device message flow 610. The initiating device and responding device may be examples of aspects of the first wireless communication device and second wireless communication device described with reference to FIG. 2.

The message flow diagram 600 may begin when an initiating device has data to transmit to a responding device. In some examples, a third party signal 615 may be present on the wireless medium. In such cases, the initiating device may wait until the wireless medium is clear.

The initiating device may then transmit an omnidirectional channel reservation request 620. The omnidirectional channel reservation request 620 may be transmitted in an omnidirectional mode. The omnidirectional channel reservation request 620 may be, for example, a RTS frame. The omnidirectional channel reservation request 620 may be transmitted in accordance with a first MCS. The omnidirectional channel reservation request 620 may include a value based on the omnidirectional channel reservation response timeout 625. The omnidirectional channel reservation response timeout 625 may be calculated based on an expected response time duration indicating the expected length of time needed to receive the channel reservation response from the responding device.

The omnidirectional channel reservation request 620 may include an indication that it is an omnidirectional channel reservation response. For example, the omnidirectional channel reservation request 620 may include a transmission mode indicator.

The initiating device may also transmit a directional channel reservation request 630. The directional channel reservation request 630 may be transmitted in a directional mode, e.g., by using beamforming techniques. The directional channel reservation request 630 may be, for example, a RTS frame. The directional channel reservation request 630 may be transmitted in accordance with the first MCS. The directional channel reservation request 630 may include a value based on the directional channel reservation response timeout 635. The directional channel reservation response timeout 635 may be calculated based on an expected response time duration indicating the expected length of time needed to receive the channel reservation response from the responding device. The directional channel reservation response timeout 635 may be shorter than the omnidirectional channel reservation response timeout 625 because it may not need to account for the time needed to transmit the directional channel reservation response 650. In other examples, the directional channel reservation request may be transmitted prior to the omnidirectional channel reservation request and the directional channel reservation response timeout may be longer than the omnidirectional channel reservation response timeout.

The directional channel reservation request 630 may also include an indication that it is a directional channel reservation request. For example, the directional channel reservation request 630 may include a transmission mode indicator.

With the exception of the responding device, all stations that receive the omnidirectional channel reservation request 620 and/or the directional channel reservation request 630 may defer from transmitting during the time period corresponding to the omnidirectional channel reservation response timeout 625 or the directional channel reservation response timeout 635. In other examples, stations that receive the omnidirectional channel reservation request 620 may defer from transmitting during the time period corresponding to the omnidirectional channel reservation response timeout 625, while stations that receive the directional channel reservation request 630 may initiate transmissions during the time period corresponding to the directional channel reservation response timeout 635.

In some examples, a station that receives a channel reservation request such as omnidirectional channel reservation request 620 or directional channel reservation request 630 may defer from transmitting during the associated time periods if the signal strength of the received channel reservation request is greater than a threshold signal strength value. For example, a station such as wireless device 225-*a* of FIG. 2 may defer from transmitting if (1) the station receives an omnidirectional channel reservation request 620 and (2) the signal strength of the omnidirectional channel reservation request 620 is greater than a threshold signal strength value.

The responding device may respond to the channel reservation request by transmitting an omnidirectional channel reservation response 640. The omnidirectional channel reservation response 640 may be transmitted in an omnidirectional mode. The omnidirectional channel reservation response 640 may be, for example, a CTS frame. The omnidirectional channel reservation response 640 may be transmitted in accordance with the first MCS. The omnidirectional channel reservation response may include a value based on the omnidirectional channel reservation timeout 645. The omnidirectional channel reservation timeout 645 may be calculated based on an expected response time duration indicating the expected length of time needed to receive one or more data frames from the initiating device. The omnidirectional channel reservation timeout 645 may also include the expected length of time needed to receive an acknowledgement request from the initiating device and transmit an acknowledgement to the initiating device.

The omnidirectional channel reservation response 640 may also include an indication that it is an omnidirectional channel reservation response. For example, the omnidirectional channel reservation response 640 may include a transmission mode indicator.

The responding device may also transmit a directional channel reservation response 650. The directional channel reservation response 650 may be transmitted in an omnidirectional mode. The directional channel reservation response 650 may be, for example, a CTS frame. The directional channel reservation response 650 may be transmitted in accordance with the first MCS. The directional channel reservation response 650 may include a value based on the directional channel reservation timeout 655. The directional channel reservation timeout 655 may be calculated based on an expected response time duration indicating the expected length of time needed to receive one or more data frames from the initiating device. The directional channel reservation timeout 655 may also include the expected length of time needed to receive an acknowledgement request from the initiating device and transmit an acknowledgement to the initiating device. However, the directional channel reservation timeout 655 may be shorter than the omnidirectional channel reservation timeout 645 because it may not need to account for the time needed to transmit the directional channel reservation response 650. In other examples, the directional channel reservation response may be transmitted prior to the omnidirectional channel reservation response and the directional channel reservation timeout may be longer than the omnidirectional channel reservation timeout.

The directional channel reservation response 650 may also include an indication that it is a directional channel reservation response. For example, the directional channel reservation response 650 may include a transmission mode indicator.

In some examples, all stations (except the initiating device) that receive either the omnidirectional channel reservation response 640 or the directional channel reservation response 650 may defer from transmitting during the time period corresponding to the omnidirectional channel reservation timeout 645 and/or the directional channel reservation timeout 655 (e.g., by setting the station's NAV). In other examples, stations that receive the omnidirectional channel reservation response 640 may defer from transmitting during the time period corresponding to the omnidirectional channel reservation timeout 645, while stations that receive the directional channel reservation response 650 may initiate transmissions during the time period corresponding to the directional channel reservation timeout 655.

In some examples, a station that receives a channel reservation response such as omnidirectional channel reservation response 640 or directional channel reservation response 650 may defer from transmitting during the associated time periods if the signal strength of the received channel reservation response is greater than a threshold signal strength value. For example, a station such as wireless device 225-*b* of FIG. 2 may defer from transmitting if (1) the station receives an omnidirectional channel reservation response 640 and (2) the signal strength of the omnidirectional channel reservation response 640 is greater than a threshold signal strength value.

The initiating device may then transmit one or more data frames 660. The one or more data frames 660 may be transmitted in a directional mode, e.g., by using beamforming techniques. The one or more data frames 660 may be transmitted in accordance with a second MCS that may be different than the first MCS. In some examples, the first MCS may be a low rate MCS and the second MCS may be a high rate MCS. For example, the first MCS may be CCK and the second MCS may be OFDM.

The one or more data frames are transmitted during the data transmission time period 665. All stations that may interfere with the receipt of the one or more data frames 660 at the responding device may be prevented from transmitting during the data transmission time period 665 based on the receipt of the omnidirectional channel reservation response 640 and/or the directional channel reservation response 650. Meanwhile, stations in the vicinity of the initiating device whose transmissions will not interfere with receipt of the one or more data frames 660 may be free to initiate transmissions during the data transmission time period 665.

After transmitting the one or more data frames 660, the initiating device may transmit an acknowledgement request 670. The acknowledgement request 670 may be transmitted in an omnidirectional mode. The acknowledgement request may be, for example, a RTS frame or a CTS frame. The acknowledgement request 670 may be transmitted in accordance with the first MCS or the second MCS. The acknowledgement request 670 may include an acknowledgement expected response time duration that has a value based on the expected length of time needed to transmit the acknowledgement from the responding device to the initiating device cannot The responding device may then transmit an acknowledgement 680 to the initiating device during the acknowledgement timeout 685 corresponding to the value of the acknowledgement expected response time duration in the acknowledgement request 670. The acknowledgement 680 may be, for example, an ACK frame or a BA. The acknowledgement may be transmitted in accordance with the first MCS or the second MCS. In some examples, acknowledgement 680 may be transmitted directionally from the responder using a transmit beam.

Figure 7:
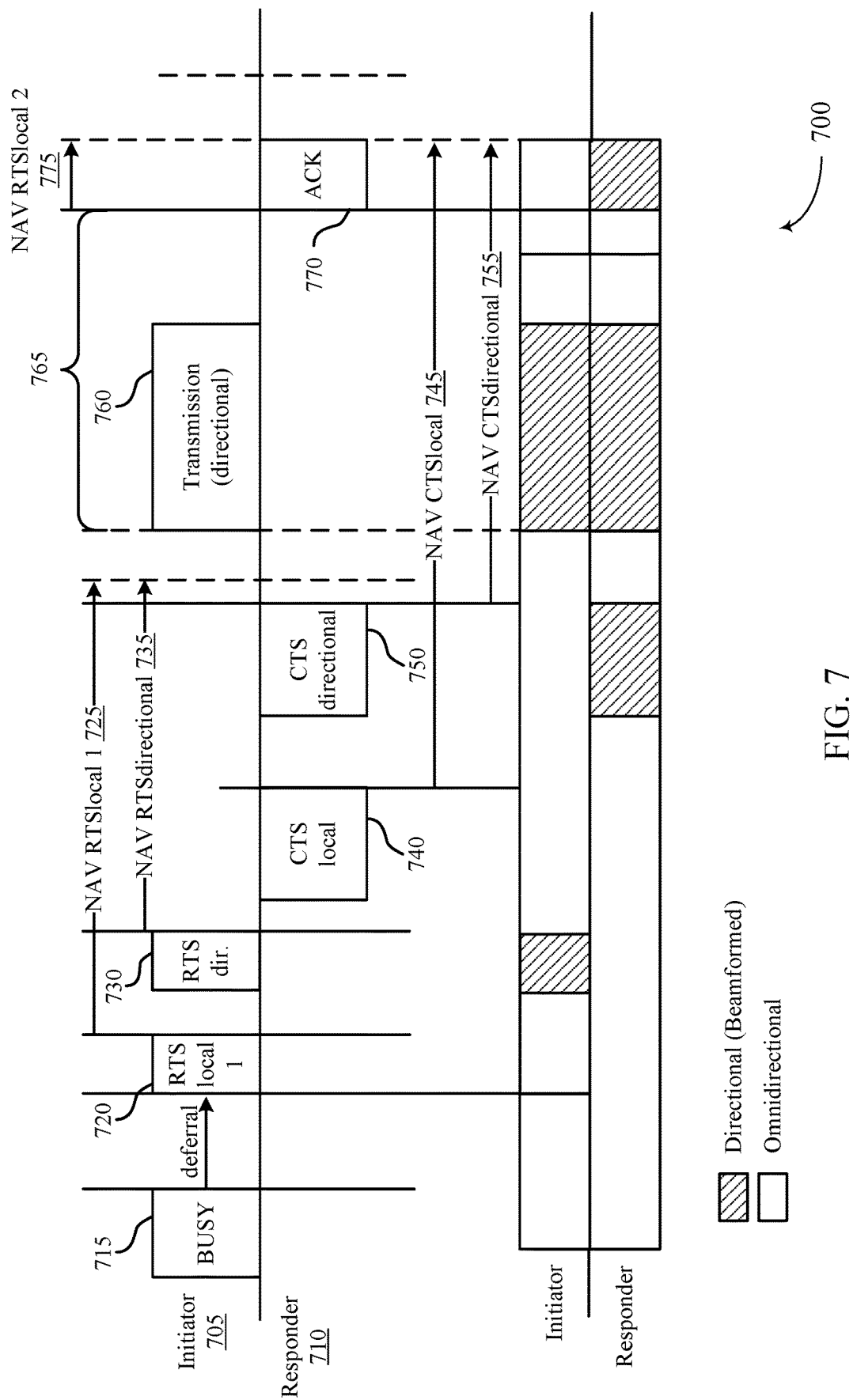

FIG. 7 illustrates an example of a message flow diagram 700 that supports channel reservation techniques for mmW systems in accordance with various aspects of the present disclosure. The message flow diagram 700 includes an initiating device message flow 705 and a responding device message flow 710. The initiating device and responding device may be examples of aspects of the first wireless communication device and second wireless communication device described with reference to FIG. 2. However, the responding device of FIG. 7 may not transmit in a directional mode.

The message flow diagram 700 may begin when an initiating device has data to transmit to a responding device. In some examples, a third party signal 715 may be present on the wireless medium. In such cases, the initiating device may wait until the wireless medium is clear.

The initiating device may then transmit an omnidirectional channel reservation request 720. The omnidirectional channel reservation request 720 may be transmitted in an omnidirectional mode. The omnidirectional channel reservation request 720 may be, for example, a RTS frame. The omnidirectional channel reservation request 720 may be transmitted in accordance with a first MCS. The omnidirectional channel reservation request 720 may include a value based on the omnidirectional channel reservation response timeout 725. The omnidirectional channel reservation response timeout 725 may be calculated based on an expected response time duration indicating the expected length of time needed to receive the channel reservation response from the responding device.

The omnidirectional channel reservation request 720 may include an indication that it is an omnidirectional channel reservation response. For example, the omnidirectional channel reservation request 720 may include a transmission mode indicator.

The initiating device may also transmit a directional channel reservation request 730. The directional channel reservation request 730 may be transmitted in a directional mode, e.g., by using beamforming techniques. The directional channel reservation request 730 may be, for example, a RTS frame. The directional channel reservation request 730 may be transmitted in accordance with the first MCS. The directional channel reservation request 730 may include a value based on the directional channel reservation response timeout 735. The directional channel reservation response timeout 735 may be calculated based on an expected response time duration indicating the expected length of time needed to receive the channel reservation response from the responding device. The directional channel reservation response timeout 735 may be shorter than the omnidirectional channel reservation response timeout 725 because it may not need to account for the time needed to transmit the directional channel reservation response 750. In other examples, the directional channel reservation request may be transmitted prior to the omnidirectional channel reservation request and the directional channel reservation response timeout may be longer than the omnidirectional channel reservation response timeout.

The directional channel reservation request 730 may also include an indication that it is a directional channel reservation request. For example, the directional channel reservation request 730 may include a transmission mode indicator.

With the exception of the responding device, all stations that receive the omnidirectional channel reservation request 720 and/or the directional channel reservation request 730 may defer from transmitting during the time period corresponding to the omnidirectional channel reservation response timeout 725 or the directional channel reservation response timeout 735. In other examples, stations that receive the omnidirectional channel reservation request 720 may defer from transmitting during the time period corresponding to the omnidirectional channel reservation response timeout 725, while stations that receive the directional channel reservation request 730 may initiate transmissions during the time period corresponding to the directional channel reservation response timeout 735.

In some examples, a station that receives a channel reservation request such as omnidirectional channel reservation request 720 or directional channel reservation request 730 may defer from transmitting during the associated time periods if the signal strength of the received channel reservation request is greater than a threshold signal strength value. For example, a station such as wireless device 225-*a* of FIG. 2 may defer from transmitting if (1) the station receives an omnidirectional channel reservation request 720 and (2) the signal strength of the omnidirectional channel reservation request 720 is greater than a threshold signal strength value.

The responding device may respond to the channel reservation request by transmitting an omnidirectional channel reservation response 740. The omnidirectional channel reservation response 740 may be transmitted in an omnidirectional mode. The omnidirectional channel reservation response 740 may be, for example, a CTS frame. The omnidirectional channel reservation response 740 may be transmitted in accordance with the first MCS. The omnidirectional channel reservation response may include a value based on the omnidirectional channel reservation timeout 745. The omnidirectional channel reservation timeout 745 may be calculated based on an expected response time duration indicating the expected length of time needed to receive one or more data frames from the initiating device. The omnidirectional channel reservation timeout 745 may also include the expected length of time needed to transmit an acknowledgement to the initiating device.

The omnidirectional channel reservation response 740 may also include an indication that it is an omnidirectional channel reservation response. For example, the omnidirectional channel reservation response 740 may include a transmission mode indicator.

The responding device may also transmit a directional channel reservation response 750. The directional channel reservation response 750 may be transmitted in an omnidirectional mode. The directional channel reservation response 750 may be, for example, a CTS frame. The directional channel reservation response 750 may be transmitted in accordance with the first MCS. The directional channel reservation response 750 may include a value based on the directional channel reservation timeout 755. The directional channel reservation timeout 755 may be calculated based on an expected response time duration indicating the expected length of time needed to receive one or more data frames from the initiating device. The directional channel reservation timeout 755 may also include the expected length of time needed to transmit an acknowledgement to the initiating device. However, the directional channel reservation timeout 755 may be shorter than the omnidirectional channel reservation timeout 745 because it may not need to account for the time needed to transmit the directional channel reservation response 750. In other examples, the directional channel reservation response may be transmitted prior to the omnidirectional channel reservation response and the directional channel reservation timeout may be longer than the omnidirectional channel reservation timeout.

The directional channel reservation response 750 may also include an indication that it is a directional channel reservation response. For example, the directional channel reservation response 750 may include a transmission mode indicator.

In some examples, all stations (except the initiating device) that receive either the omnidirectional channel reservation response 740 or the directional channel reservation response 750 may defer from transmitting during the time period corresponding to the omnidirectional channel reservation timeout 745 and/or the directional channel reservation timeout 755 (e.g., by setting the station's NAV). In other examples, stations that receive the omnidirectional channel reservation response 740 may defer from transmitting during the time period corresponding to the omnidirectional channel reservation timeout 745, while stations that receive the directional channel reservation response 750 may initiate transmissions during the time period corresponding to the directional channel reservation timeout 755.

In some examples, a station that receives a channel reservation response such as omnidirectional channel reservation response 740 or directional channel reservation response 750 may defer from transmitting during the associated time periods if the signal strength of the received channel reservation response is greater than a threshold signal strength value. For example, a station such as wireless device 225-b of FIG. 2 may defer from transmitting if (1) the station receives an omnidirectional channel reservation response 740 and (2) the signal strength of the omnidirectional channel reservation response 740 is greater than a threshold signal strength value.

The initiating device may then transmit one or more data frames 760. The one or more data frames 760 may be transmitted in a directional mode, e.g., by using beamforming techniques. The one or more data frames 760 may be transmitted in accordance with a second MCS that may be different than the first MCS. In some examples, the first MCS may be a low rate MCS and the second MCS may be a high rate MCS. For example, the first MCS may be CCK and the second MCS may be OFDM.

The one or more data frames are transmitted during the data transmission time period 765. All stations that may interfere with the receipt of the one or more data frames 760 at the responding device may be prevented from transmitting during the data transmission time period 765 based on the receipt of the omnidirectional channel reservation response 740 and/or the directional channel reservation response 750. Meanwhile, stations in the vicinity of the initiating device whose transmissions will not interfere with receipt of the one or more data frames 760 may be free to initiate transmissions during the data transmission time period 765.

After receiving the one or more data frames 760, the responding device may transmit an acknowledgement 770 to the initiating device to indicate that the one or more data frames 760 were successfully received. The acknowledgement may be, for example, an ACK frame or a BA frame. The acknowledgement may be transmitted in accordance with the first MCS or the second MCS. In some examples, acknowledgement 770 may be transmitted directionally from the responder using a transmit beam.

In some examples, the omnidirectional channel reservation request 720 and/or the directional channel reservation request 730 may include a field protecting the transmission of the acknowledgement 770. For example, the omnidirectional channel reservation request 720 may include an expected response time duration value based on the acknowledgement timeout 775 and an offset value based on the data transmission time period 765, such that the acknowledgement timeout 775 may start after the data transmission time period 765 has lapsed.

Figure 8:
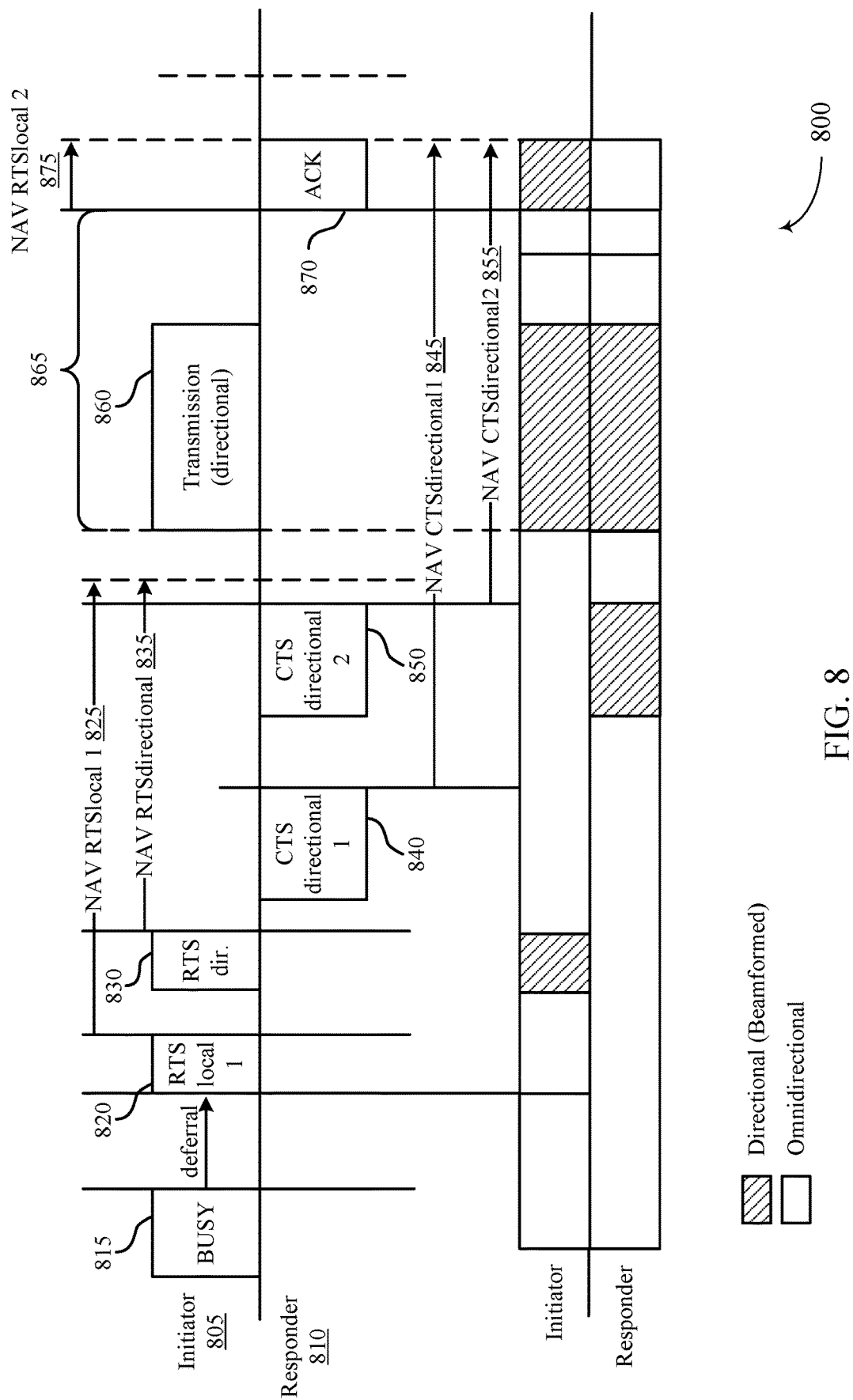

FIG. 8 illustrates an example of a message flow diagram 800 that supports channel reservation techniques for mmW systems in accordance with various aspects of the present disclosure. The message flow diagram 800 includes an initiating device message flow 805 and a responding device message flow 810. The initiating device and responding device may be examples of aspects of the first wireless communication device and second wireless communication device described with reference to FIG. 2.

The message flow diagram 800 may begin when an initiating device has data to transmit to a responding device. In some examples, a third party signal 615 may be present on the wireless medium. In such cases, the initiating device may wait until the wireless medium is clear.

The initiating device may then transmit an omnidirectional channel reservation request 820. The omnidirectional channel reservation request 820 may be transmitted in an omnidirectional mode. The omnidirectional channel reservation request 820 may be, for example, a RTS frame. The omnidirectional channel reservation request 820 may be transmitted in accordance with a first MCS. The omnidirectional channel reservation request 820 may include a value based on the omnidirectional channel reservation response timeout 825. The omnidirectional channel reservation response timeout 825 may be calculated based on an expected response time duration indicating the expected length of time needed to receive the channel reservation response from the responding device.

The omnidirectional channel reservation request 820 may include an indication that it is an omnidirectional channel reservation response. For example, the omnidirectional channel reservation request 820 may include a transmission mode indicator.

The initiating device may also transmit a directional channel reservation request 830. The directional channel reservation request 830 may be transmitted in a directional mode, e.g., by using beamforming techniques. The directional channel reservation request 830 may be, for example, a RTS frame. The directional channel reservation request 830 may be transmitted in accordance with the first MCS. The directional channel reservation request 830 may include a value based on the directional channel reservation response timeout 835. The directional channel reservation response timeout 835 may be calculated based on an expected response time duration indicating the expected length of time needed to receive the channel reservation response from the responding device. The directional channel reservation response timeout 835 may be shorter than the omnidirectional channel reservation response timeout 825 because it may not need to account for the time needed to transmit the omnidirectional channel reservation request 820. In other examples, the directional channel reservation request may be transmitted prior to the omnidirectional channel reservation request and the directional channel reservation response timeout may be longer than the omnidirectional channel reservation response timeout.

The directional channel reservation request 830 may also include an indication that it is a directional channel reservation request. For example, the directional channel reservation request 830 may include a transmission mode indicator.

With the exception of the responding device, all stations that receive the omnidirectional channel reservation request 820 and/or the directional channel reservation request 830 may defer from transmitting during the time period corresponding to the omnidirectional channel reservation response timeout 825 or the directional channel reservation response timeout 835. In other examples, stations that receive the omnidirectional channel reservation request 820 may defer from transmitting during the time period corresponding to the omnidirectional channel reservation response timeout 825, while stations that receive the directional channel reservation request 830 may initiate transmissions during the time period corresponding to the directional channel reservation response timeout 835.

In some examples, a station that receives a channel reservation request such as omnidirectional channel reservation request 820 or directional channel reservation request 830 may defer from transmitting during the associated time periods if the signal strength of the received channel reservation request is greater than a threshold signal strength value. For example, a station such as wireless device 225-*a* of FIG. 2 may defer from transmitting if (1) the station receives an omnidirectional channel reservation request 820 and (2) the signal strength of the omnidirectional channel reservation request 820 is greater than a threshold signal strength value.

The responding device may respond to the channel reservation request by transmitting a first directional channel reservation response 840, which may be directed to the initiating device and transmitted in a directional mode. The first directional channel reservation response 840 may be, for example, a CTS frame. The first directional channel reservation response may be transmitted in accordance with the first MCS. The first directional channel reservation response may include a value based on the first directional channel reservation timeout 845. The first directional channel reservation timeout 845 may be calculated based on an expected response time duration indicating the expected length of time needed to receive one or more data frames from the initiating device. The first directional channel reservation timeout 845 may also include the expected length of time needed to receive an acknowledgement request from the initiating device and transmit an acknowledgement to the initiating device.

The responding device may also transmit one or more additional directional channel reservation responses to silence dominate jammers. For example, the responding device may maintain a list of dominant jammers in an omnidirectional area and transmit a directional channel reservation response to each of the stations on the list. For purposes of illustration, in the example shown in FIG. 8 an additional directional channel reservation response is transmitted.

The responding device may transmit a second directional channel reservation response 850. The second directional channel reservation response 850 is directed to a station other than the initiating device and is transmitted in a directional mode. For example, the second directional channel reservation response may be directed to a station such as wireless device 225-*b* in FIG. 2. The second directional response may be, for example, a CTS frame. The second directional response may be transmitted in accordance with the first MCS. The second directional channel reservation response 850 may include a value based on the second directional channel reservation timeout 855. The second directional channel reservation timeout 855 may be calculated based on an expected response time duration indicating the expected length of time needed to receive one or more data frames from the initiating device. The second directional channel reservation timeout 855 may also include the expected length of time needed to receive an acknowledgement request from the initiating device and transmit an acknowledgement to the initiating device. The second directional channel reservation timeout 855 may be shorter than the first directional channel reservation timeout 845 because it may not need to account for the time needed to transmit the second directional channel reservation response 850. In other examples, the second directional channel reservation response may be transmitted prior to the first directional channel reservation response and the second directional channel reservation timeout may be longer than the first directional channel reservation timeout.

In some examples, stations (excluding the initiating device) that receive a directional channel reservation response such as the second directional channel reservation response 850 may defer from transmitting during the time period corresponding to the associated timeout, e.g., second directional channel reservation timeout 855 (e.g., by setting the station's NAV). In other examples, stations to which the additional directional channel reservation responses are directed may defer from transmitting during the time period corresponding to the second directional channel reservation timeout 855, while other stations that receive the additional directional channel reservation responses may initiate transmissions during the time period corresponding to the second directional channel reservation timeout 855.

The initiating device may then transmit one or more directional transmissions 860. The one or more directional transmissions 860 may be transmitted in a directional mode, e.g., by using beamforming techniques. The one or more directional transmissions 860 may be transmitted in accordance with a second MCS that may be different than the first MCS. In some examples, the first MCS may be a low rate MCS and the second MCS may be a high rate MCS. For example, the first MCS may be CCK and the second MCS may be OFDM.

The one or more data frames are transmitted during the data transmission time period 865. Stations that may interfere with the receipt of the one or more directional transmissions 860 at the responding device may be prevented from transmitting during the data transmission time period 865 based on the receipt of the first directional channel reservation response 840 and/or the second directional channel reservation response 850. Meanwhile, stations in the vicinity of the initiating device whose transmissions will not interfere with receipt of the one or more directional transmissions 860 may be free to initiate transmissions during the data transmission time period 865.

After receiving the one or more directional transmissions 860, the responding device may transmit an acknowledgement 870. The acknowledgement 870 may be transmitted in an omnidirectional mode, while the responding device may receive the acknowledgement 870 using a receive beam. The acknowledgement 870 may be, for example, an ACK frame or a BA frame. The acknowledgement 870 may be transmitted in accordance with the first MCS or the second MCS. In some examples, acknowledgement 870 may be transmitted omnidirectionally from the responder, and received directionally by the initiator using a receive beam.

In some examples, the omnidirectional channel reservation request 820 and/or the directional channel reservation request 830 may include a field protecting the transmission of the acknowledgement 870. For example, the omnidirectional channel reservation request 820 may include an expected response time duration value based on the acknowledgement timeout 875 and an offset value based on the data transmission time period 865, such that the acknowledgement timeout 875 may start after the data transmission time period 865 has lapsed.

Figure 9:
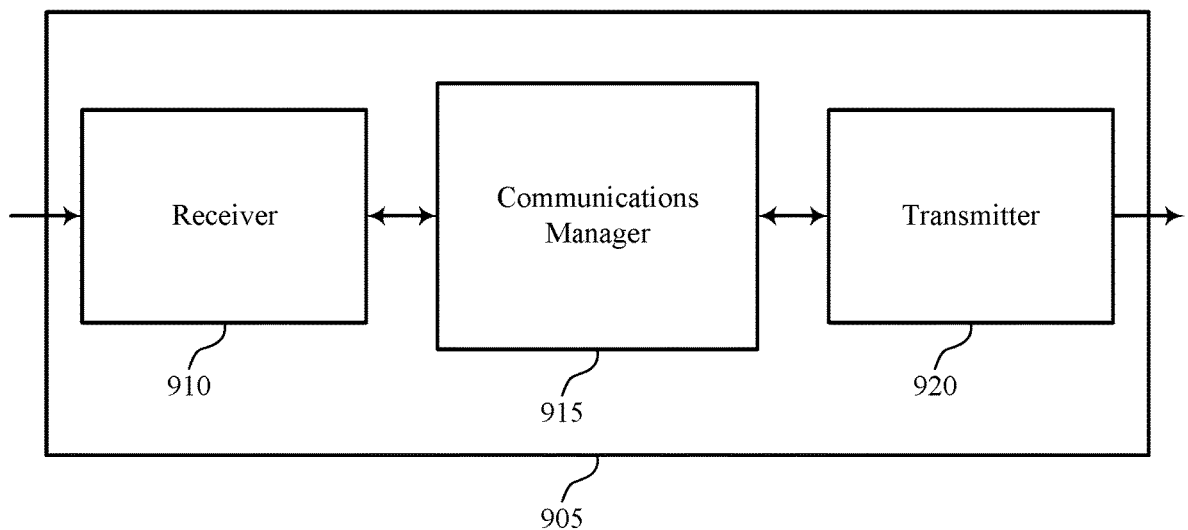
FIGS. 9 through 11 show block diagrams of a device that supports channel reservation techniques for mmW systems in accordance with aspects of the present disclosure.

FIG. 9 shows a block diagram 900 of a wireless device 905 that supports channel reservation techniques for mmW systems in accordance with various aspects of the present disclosure. Wireless device 905 may be an example of aspects of a UE 115 and/or base station 105 as described with reference to FIG. 1. wireless device 905 may include receiver 910, communications manager 915, and transmitter 920. wireless device 905 may also include a processor. Each of these components may be in communication with one another (e.g., via one or more buses).

Receiver 910 may receive information such as packets, user data, or control information associated with various information channels (e.g., control channels, data channels, and information related to channel reservation techniques for mmW systems, etc.). Information may be passed on to other components of the device. The receiver 910 may be an example of aspects of the transceiver 1235 described with reference to FIG. 12.

Communications manager 915 may be an example of aspects of the communications manager 1215 described with reference to FIG. 12. Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In an initiating device, communications manager 915 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. Communications manager 915 may receive the channel reservation response from the second wireless device during the first expected response time duration, and transmit, to the second wireless device, a directional transmission according to the directional channel reservation request.

In a responding device, communications manager 915 may receive a channel reservation request from a second wireless device over a shared radio frequency spectrum band, the channel reservation request including a first expected response time duration for the second wireless device to receive a channel reservation response in response to the channel reservation request. Communications manager 915 may transmit, during the first expected response time duration, the channel reservation response in response to the received channel reservation request, and receive, from the second wireless device, a directional transmission according to the channel reservation request.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
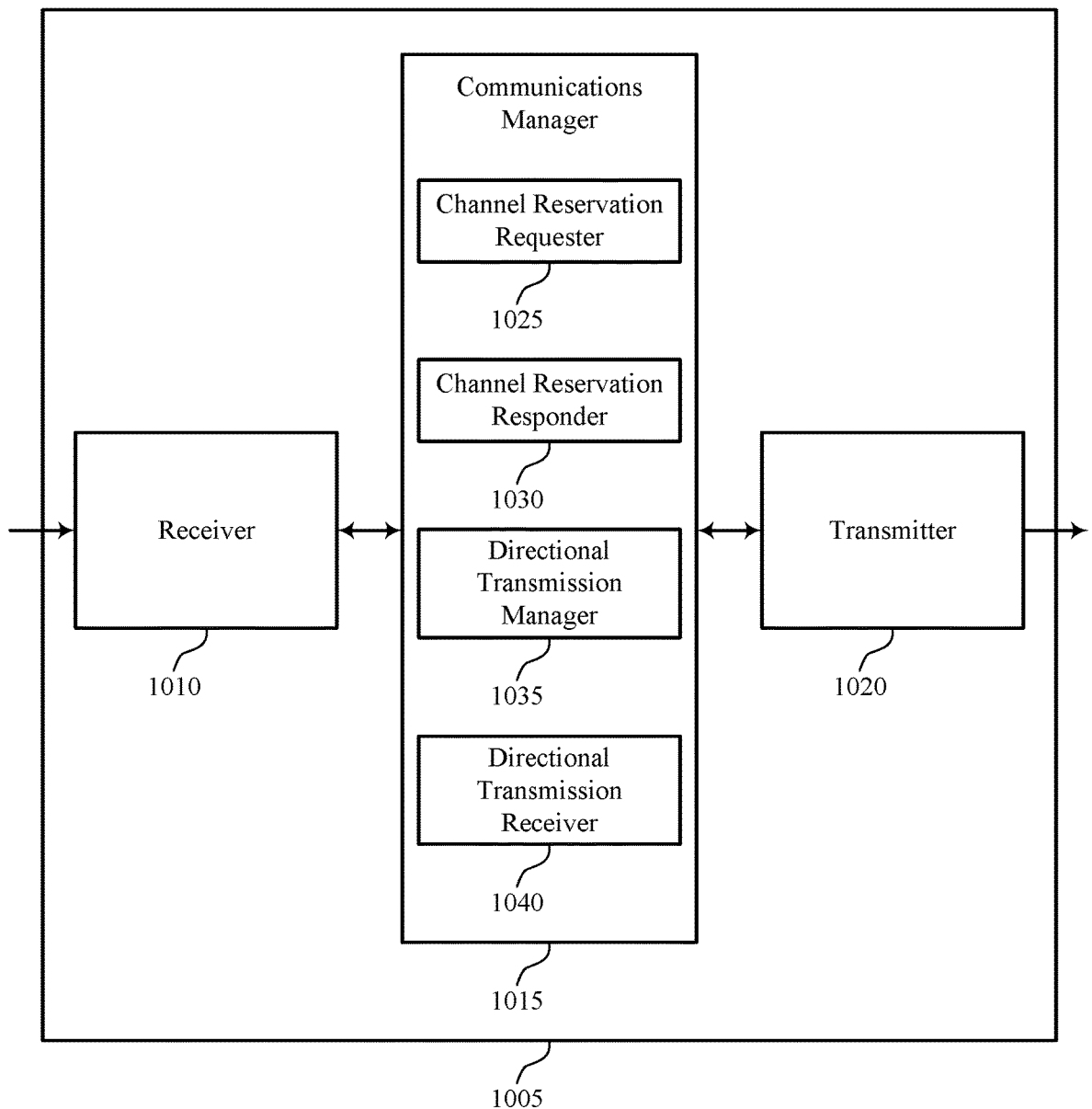

FIG. 10 shows a block diagram 1000 of a wireless device 1005 that supports channel reservation techniques for mmW systems in accordance with various aspects of the present disclosure. Wireless device 1005 may be an example of aspects of a wireless device 905 or a UE 115 and/or base station 105 as described with reference to FIGS. 1 and 9. wireless device 1005 may include receiver 1010, communications manager 1015, and transmitter 1020. wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel reservation techniques for mmW systems, etc.). Information may be passed on to other components of the device. The receiver 1010 may be an example of aspects of the transceiver 1235 described with reference to FIG. 12.

Communications manager 1015 may be an example of aspects of the communications manager 1215 described with reference to FIG. 12. Communications manager 1015 may also include channel reservation requester 1025, channel reservation responder 1030, directional transmission manager 1035, and directional transmission receiver 1040.

Channel reservation requester 1025 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. Channel reservation requester 1025 may transmit an omnidirectional channel reservation request over the shared radio frequency spectrum band, the omnidirectional channel reservation request including a second expected response time duration for the first wireless device to receive the channel reservation response from the second wireless device in response to the directional channel reservation request. Channel reservation requester 1025 may receive a channel reservation request from a second wireless device over a shared radio frequency spectrum band, the channel reservation request including a first expected response time duration for the second wireless device to receive a channel reservation response in response to the channel reservation request. In some cases, the directional channel reservation request further includes a second duration indicating an expected time for the first wireless device to receive an acknowledgement transmission in response to the directional transmission. In some cases, the directional channel reservation request is transmitted prior to the omnidirectional channel reservation request, and the first expected response time duration is longer than the second expected response time duration. In some cases, the omnidirectional channel reservation request is transmitted prior to the directional channel reservation request, and the second expected response time duration is longer than the first expected response time duration.

Channel reservation responder 1030 may receive the channel reservation response from the second wireless device during the first expected response time duration and transmit, during the first expected response time duration, the channel reservation response in response to the received channel reservation request. In some cases, receiving the channel reservation response includes: receiving the channel reservation response from the second wireless device on a receive beam over the shared radio frequency spectrum band.

Directional transmission manager 1035 may transmit, to the second wireless device, a directional transmission according to the directional channel reservation request and transmit the directional transmission to the second wireless device on a transmit beam over the shared radio frequency spectrum band.

Directional transmission receiver 1040 may receive, from the second wireless device, a directional transmission according to the channel reservation request.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
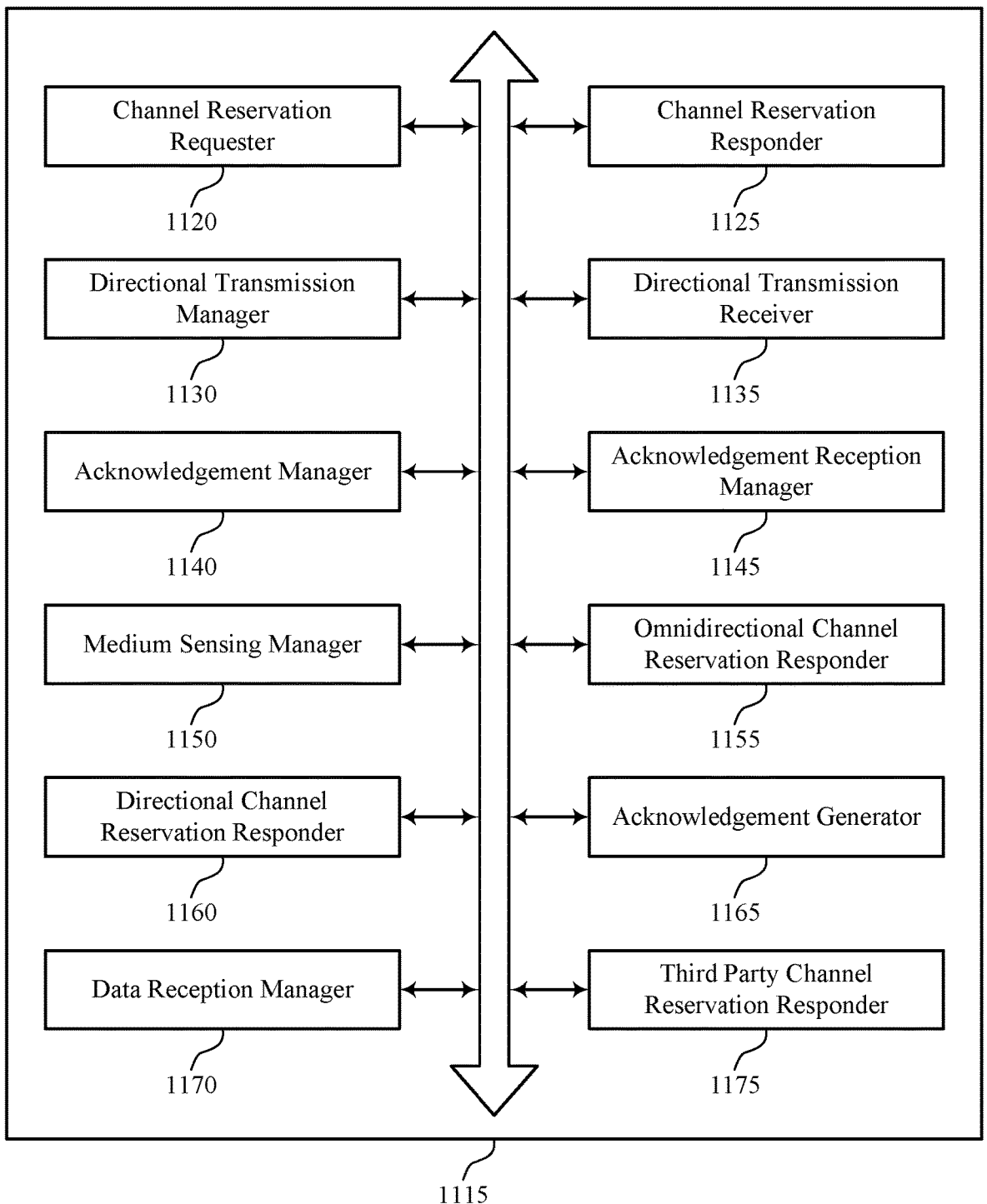

FIG. 11 shows a block diagram 1100 of a communications manager 1115 that supports channel reservation techniques for mmW systems in accordance with various aspects of the present disclosure. The communications manager 1115 may be an example of aspects of a communications manager 915, a communications manager 1015, or a communications manager 1215 described with reference to FIGS. 9, 10, and 12. The communications manager 1115 may include channel reservation requester 1120, channel reservation responder 1125, directional transmission manager 1130, directional transmission receiver 1135, acknowledgement manager 1140, acknowledgement reception manager 1145, medium sensing manager 1150, omnidirectional channel reservation responder 1155, directional channel reservation responder 1160, acknowledgement generator 1165, data reception manager 1170, and third party channel reservation responder 1175. Each of these modules may communicate, directly or indirectly, with one another (e.g., via one or more buses).

Channel reservation requester 1120 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. Channel reservation requester 1120 may transmit an omnidirectional channel reservation request over the shared radio frequency spectrum band, the omnidirectional channel reservation request including a second expected response time duration for the first wireless device to receive the channel reservation response from the second wireless device in response to the directional channel reservation request. Channel reservation requester 1120 may receive a channel reservation request from a second wireless device over a shared radio frequency spectrum band, the channel reservation request including a first expected response time duration for the second wireless device to receive a channel reservation response in response to the channel reservation request. In some cases, the directional channel reservation request further includes: a second duration indicating an expected time for the first wireless device to receive an acknowledgement transmission in response to the directional transmission. In some cases, the directional channel reservation request is transmitted prior to the omnidirectional channel reservation request, and the first expected response time duration is longer than the second expected response time duration. In some cases, the omnidirectional channel reservation request is transmitted prior to the directional channel reservation request, and the second expected response time duration is longer than the first expected response time duration. In some cases, the first expected response time duration includes a time duration for the first wireless device to receive a directional channel reservation response from the second wireless device, or a time duration for the first wireless device to receive an omnidirectional channel reservation response from the second wireless device, or a combination thereof. In some cases, the directional transmission is transmitted using a different transmit beam than the transmit beam of the directional channel reservation request.

Channel reservation responder 1125 may receive the channel reservation response from the second wireless device during the first expected response time duration and transmit, during the first expected response time duration, the channel reservation response in response to the received channel reservation request. In some cases, receiving the channel reservation response includes receiving the channel reservation response from the second wireless device on a receive beam over the shared radio frequency spectrum band.

Directional transmission manager 1130 may transmit, to the second wireless device, a directional transmission according to the directional channel reservation request and transmit the directional transmission to the second wireless device on a transmit beam over the shared radio frequency spectrum band.

Directional transmission receiver 1135 may receive, from the second wireless device, a directional transmission according to the channel reservation request.

Acknowledgement manager 1140 may transmit, by the first wireless device, a second channel reservation response following the directional transmission, the second channel reservation response including a second expected response time duration for the first wireless device to receive an acknowledgement transmission in response to the directional transmission. Acknowledgement manager 1140 may receive, in the channel reservation request, a second expected response time duration for the second wireless device to receive an acknowledgement transmission in response to the directional transmission. Acknowledgement manager 1140 may receive, from the second wireless device, a second channel reservation response, the second channel reservation response including a second expected response time duration for the second wireless device to receive an acknowledgement transmission in response to the directional transmission.

Acknowledgement reception manager 1145 may receive, on a receive beam over the shared radio frequency spectrum band, an acknowledgement in response to the directional transmission.

Medium sensing manager 1150 may perform a contention-based protocol prior to transmitting the directional channel reservation request over the shared radio frequency spectrum band.

Omnidirectional channel reservation responder 1155 may transmit an omnidirectional channel reservation response in response to the received channel reservation request. In some cases, transmitting the channel reservation response includes: transmitting, during the first expected response time duration, an omnidirectional channel reservation response in response to the received channel reservation request, by the omnidirectional channel reservation responder 1155. In some cases, the omnidirectional channel reservation response includes a second expected response time duration for the directional transmission to be received and an acknowledgment to be transmitted.

Directional channel reservation responder 1160 may transmit, during the first expected response time duration, a directional channel reservation response in response to the received channel reservation request. Directional channel reservation responder 1160 may transmit, during the first expected response time duration, a first directional channel reservation response in response to the received channel reservation request and transmit, during the first expected response time duration, a second directional channel reservation response in response to the received channel reservation request, where the first directional channel reservation response and the second directional channel reservation response are directed to different wireless devices. In some cases, transmitting the directional channel reservation response includes transmitting the directional channel reservation response to the second wireless device on a transmit beam over the shared radio frequency spectrum band. In some cases, transmitting the directional channel reservation response includes transmitting the directional channel reservation response to the second wireless device, the second wireless device to receive the directional channel reservation response on a receive beam over the shared radio frequency spectrum band. In some cases, the directional channel reservation response includes a third expected response time duration for the directional transmission to be received and an acknowledgment to be transmitted. In some cases, transmitting the channel reservation response includes transmitting a first directional channel reservation response on a first transmit beam to an expected location of the second wireless device.

Acknowledgement generator 1165 may transmit, to the second wireless device during the second expected response time duration, an acknowledgement transmission in response to the directional transmission and transmit, on a transmit beam over the shared radio frequency spectrum band, an acknowledgement in response to the received directional transmission.

Data reception manager 1170 may receive the directional transmission from the second wireless device on a receive beam over the shared radio frequency spectrum band.

Third party channel reservation responder 1175 may transmit a second directional channel reservation response on a second transmit beam to an expected location of a third wireless device.

Figure 12:
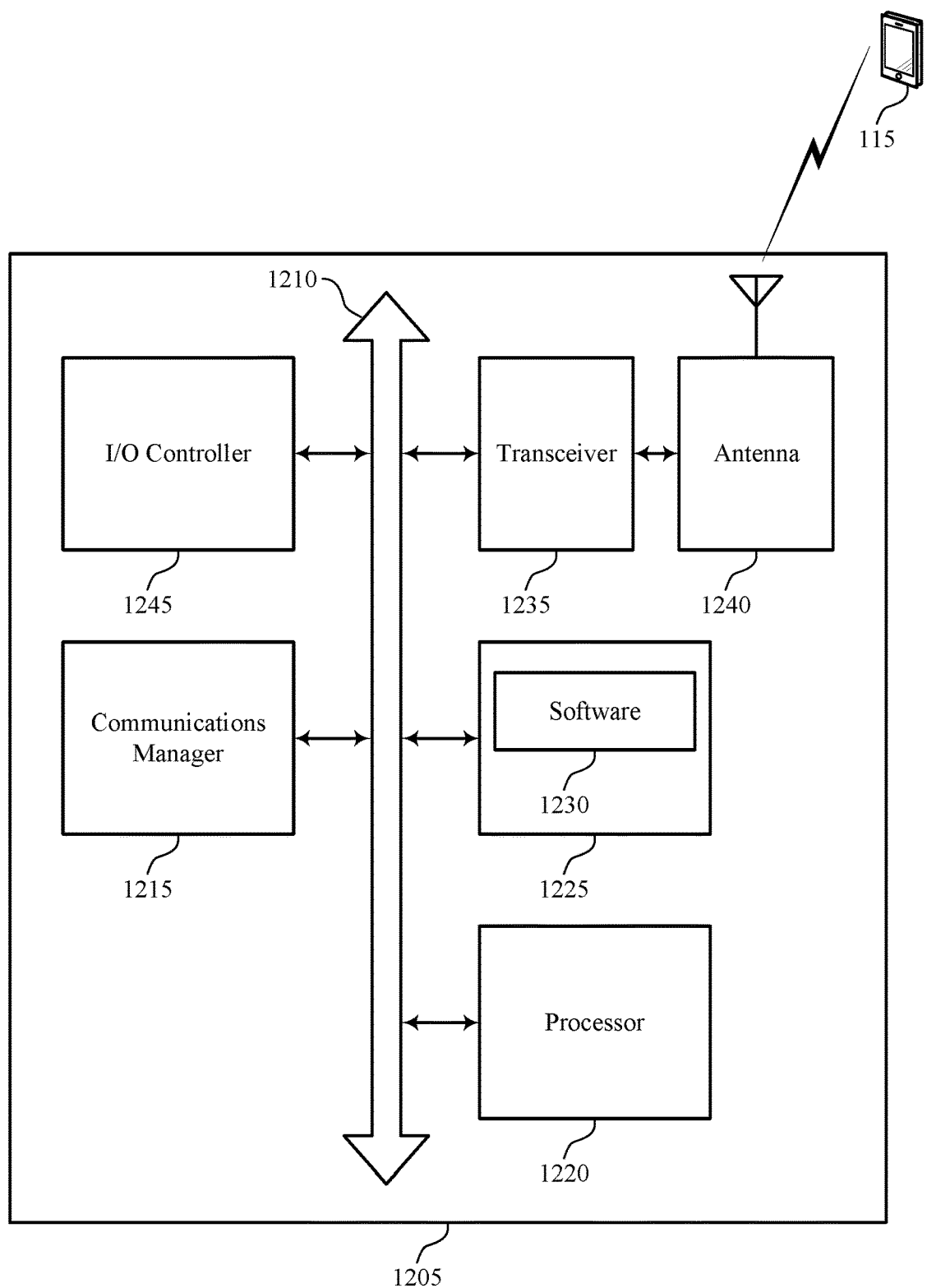
FIG. 12 illustrates a block diagram of a system including a wireless device that supports channel reservation techniques for mmW systems in accordance with aspects of the present disclosure.

FIG. 12 shows a diagram of a system 1200 including a device 1205 that supports channel reservation techniques for mmW systems in accordance with various aspects of the present disclosure. Device 1205 may be an example of or include the components of wireless device 905, wireless device 1005, or a UE 115 and/or base station 105 as described above, e.g., with reference to FIGS. 1, 9 and 10. Device 1205 may include components for bidirectional voice and data communications including components for transmitting and receiving communications, including communications manager 1215, processor 1220, memory 1225, software 1230, transceiver 1235, antenna 1240, and I/O controller 1245. These components may be in electronic communication via one or more busses (e.g., bus 1210).

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting channel reservation techniques for mmW systems).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support channel reservation techniques for mmW systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
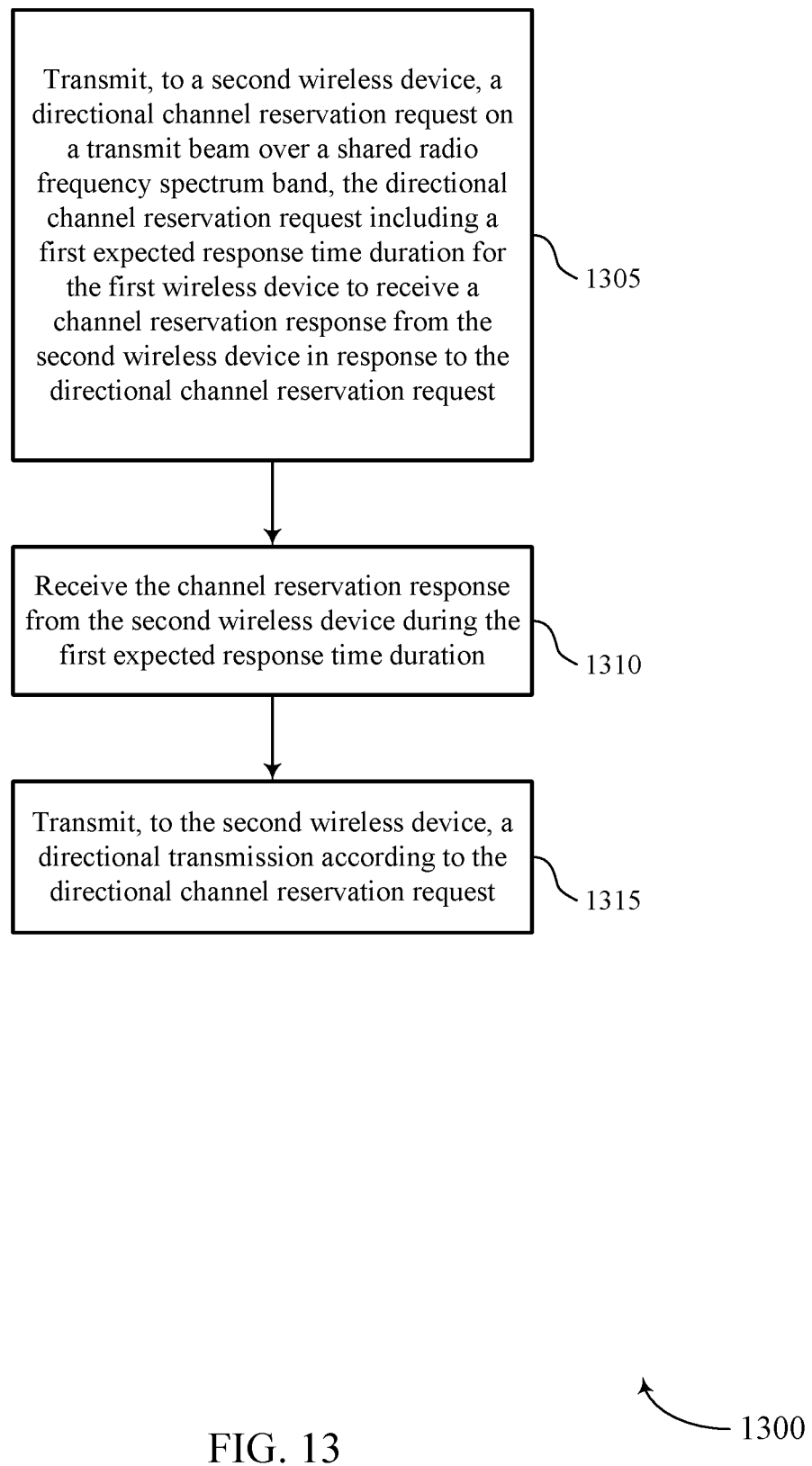
FIGS. 13 through 19 illustrate methods for channel reservation techniques for mmW systems in accordance with aspects of the present disclosure.

FIG. 13 shows a flowchart illustrating a method 1300 for channel reservation techniques for mmW systems in accordance with various aspects of the present disclosure. The operations of method 1300 may be implemented by a UE 115 and/or base station 105 or its components as described herein. For example, the operations of method 1300 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1305 the UE 115 and/or base station 105 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The operations of block 1305 may be performed according to the methods described with reference to FIGS. 1 through 8. In certain examples, aspects of the operations of block 1305 may be performed by a channel reservation requester as described with reference to FIGS. 9 through 12.

At block 1310 the UE 115 and/or base station 105 may receive the channel reservation response from the second wireless device during the first expected response time duration. The operations of block 1310 may be performed according to the methods described with reference to FIGS. 1 through 8. In certain examples, aspects of the operations of block 1310 may be performed by a channel reservation responder as described with reference to FIGS. 9 through 12.

At block 1315 the UE 115 and/or base station 105 may transmit, to the second wireless device, a directional transmission according to the directional channel reservation request. The operations of block 1315 may be performed according to the methods described with reference to FIGS. 1 through 8. In certain examples, aspects of the operations of block 1315 may be performed by a directional transmission manager as described with reference to FIGS. 9 through 12.

Figure 14:
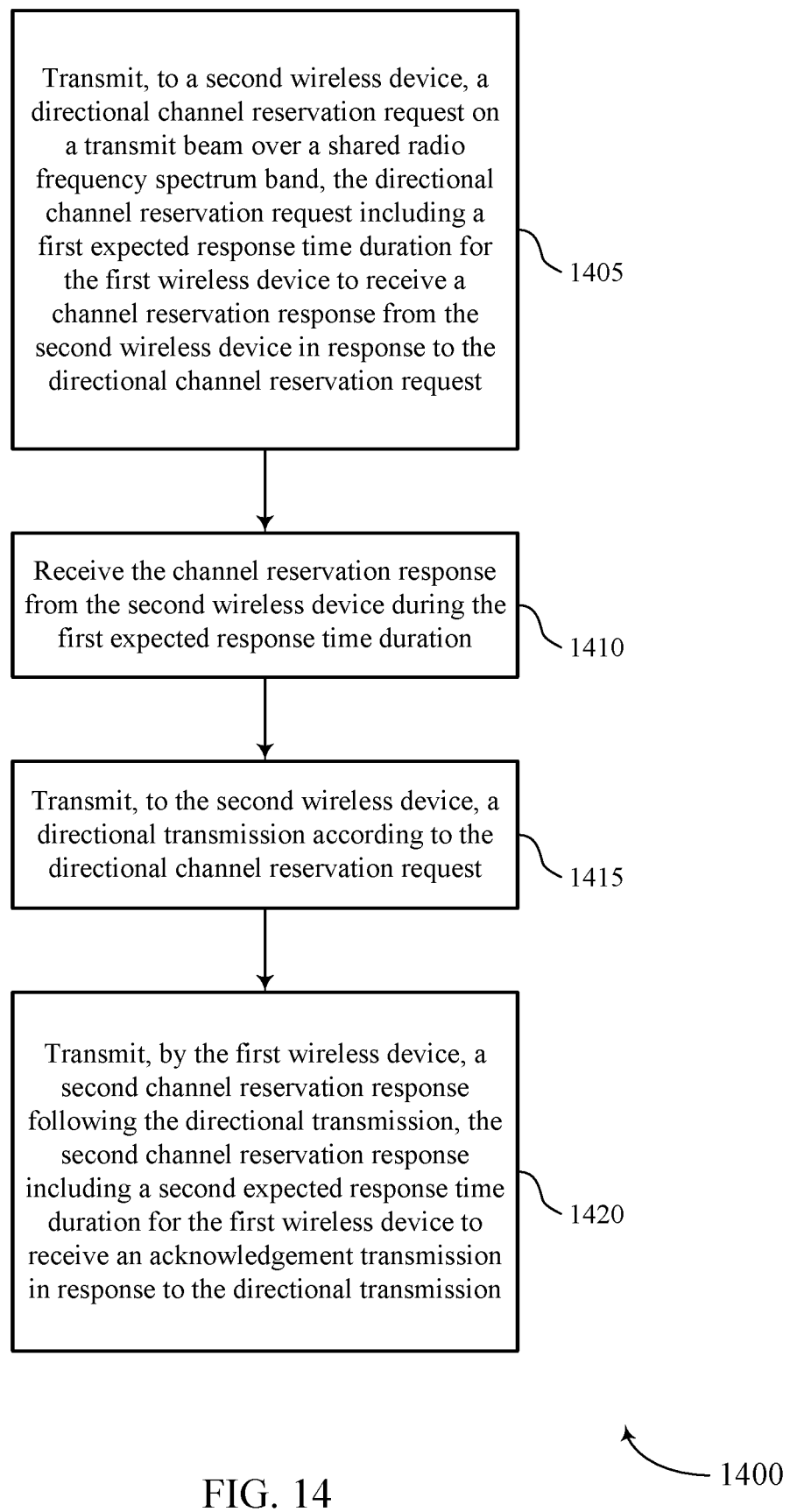

FIG. 14 shows a flowchart illustrating a method 1400 for channel reservation techniques for mmW systems in accordance with various aspects of the present disclosure. The operations of method 1400 may be implemented by a UE 115 and/or base station 105 or its components as described herein. For example, the operations of method 1400 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1405 the UE 115 and/or base station 105 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The operations of block 1405 may be performed according to the methods described with reference to FIGS. 1 through 8. In certain examples, aspects of the operations of block 1405 may be performed by a channel reservation requester as described with reference to FIGS. 9 through 12.

At block 1410 the UE 115 and/or base station 105 may receive the channel reservation response from the second wireless device during the first expected response time duration. The operations of block 1410 may be performed according to the methods described with reference to FIGS. 1 through 8. In certain examples, aspects of the operations of block 1410 may be performed by a channel reservation responder as described with reference to FIGS. 9 through 12.

At block 1415 the UE 115 and/or base station 105 may transmit, to the second wireless device, a directional transmission according to the directional channel reservation request. The operations of block 1415 may be performed according to the methods described with reference to FIGS. 1 through 8. In certain examples, aspects of the operations of block 1415 may be performed by a directional transmission manager as described with reference to FIGS. 9 through 12.

At block 1420 the UE 115 and/or base station 105 may transmit, by the first wireless device, a second channel reservation response following the directional transmission, the second channel reservation response including a second expected response time duration for the first wireless device to receive an acknowledgement transmission in response to the directional transmission. The operations of block 1420 may be performed according to the methods described with reference to FIGS. 1 through 8. In certain examples, aspects of the operations of block 1420 may be performed by an acknowledgement manager as described with reference to FIGS. 9 through 12.

Figure 15:
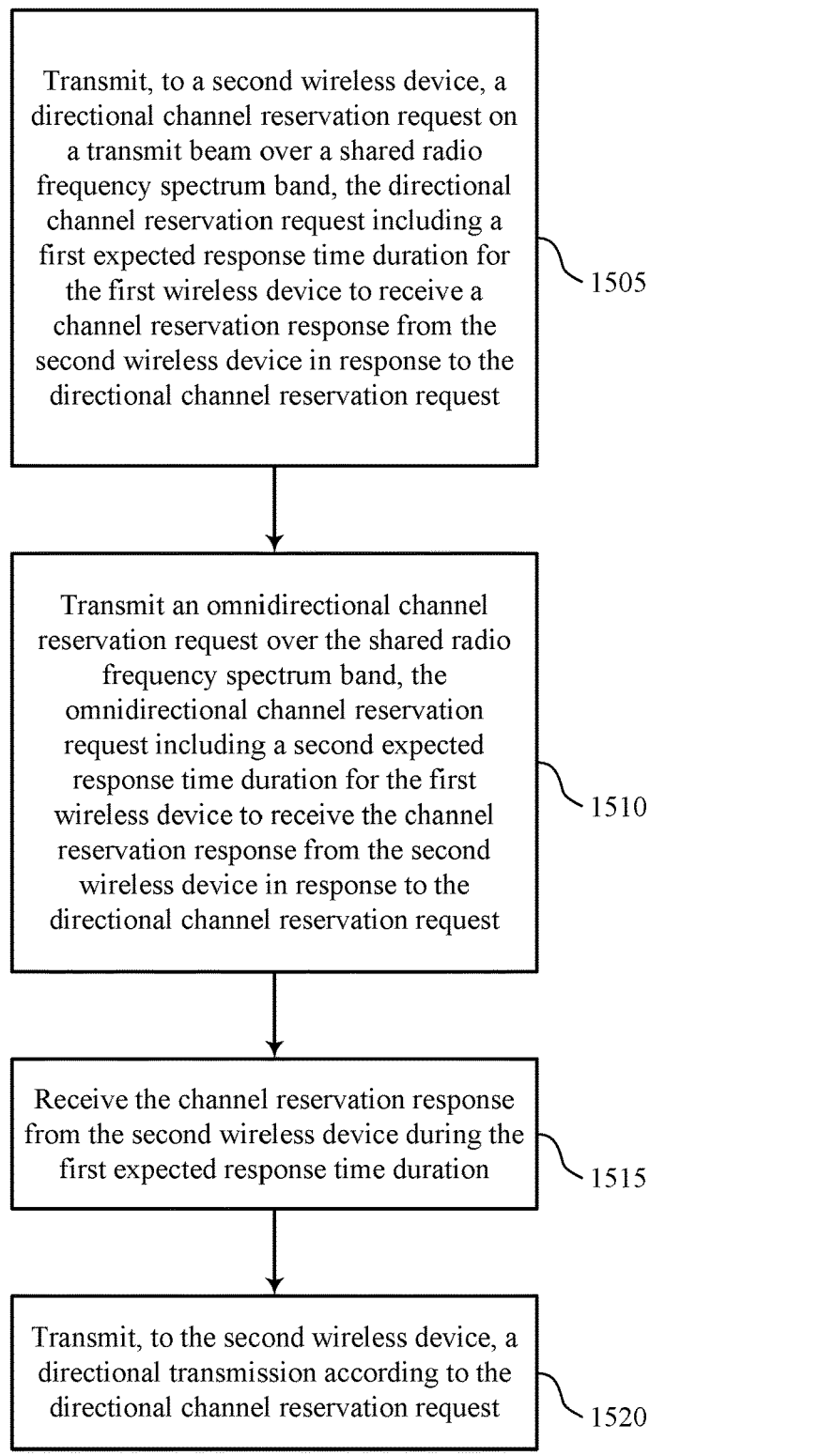

FIG. 15 shows a flowchart illustrating a method 1500 for channel reservation techniques for mmW systems in accordance with various aspects of the present disclosure. The operations of method 1500 may be implemented by a UE 115 and/or base station 105 or its components as described herein. For example, the operations of method 1500 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1505 the UE 115 and/or base station 105 may transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request. The operations of block 1505 may be performed according to the methods described with reference to FIGS. 1 through 8. In certain examples, aspects of the operations of block 1505 may be performed by a channel reservation requester as described with reference to FIGS. 9 through 12.

At block 1510 the UE 115 and/or base station 105 may transmit an omnidirectional channel reservation request over the shared radio frequency spectrum band, the omnidirectional channel reservation request comprising a second expected response time duration for the first wireless device to receive the channel reservation response from the second wireless device in response to the directional channel reservation request. The operations of block 1510 may be performed according to the methods described with reference to FIGS. 1 through 8. In certain examples, aspects of the operations of block 1510 may be performed by a channel reservation requester as described with reference to FIGS. 9 through 12.

At block 1515 the UE 115 and/or base station 105 may receive the channel reservation response from the second wireless device during the first expected response time duration. The operations of block 1515 may be performed according to the methods described with reference to FIGS. 1 through 8. In certain examples, aspects of the operations of block 1515 may be performed by a channel reservation responder as described with reference to FIGS. 9 through 12.

At block 1520 the UE 115 and/or base station 105 may transmit, to the second wireless device, a directional transmission according to the directional channel reservation request. The operations of block 1520 may be performed according to the methods described with reference to FIGS. 1 through 8. In certain examples, aspects of the operations of block 1520 may be performed by a directional transmission manager as described with reference to FIGS. 9 through 12.

Figure 16:
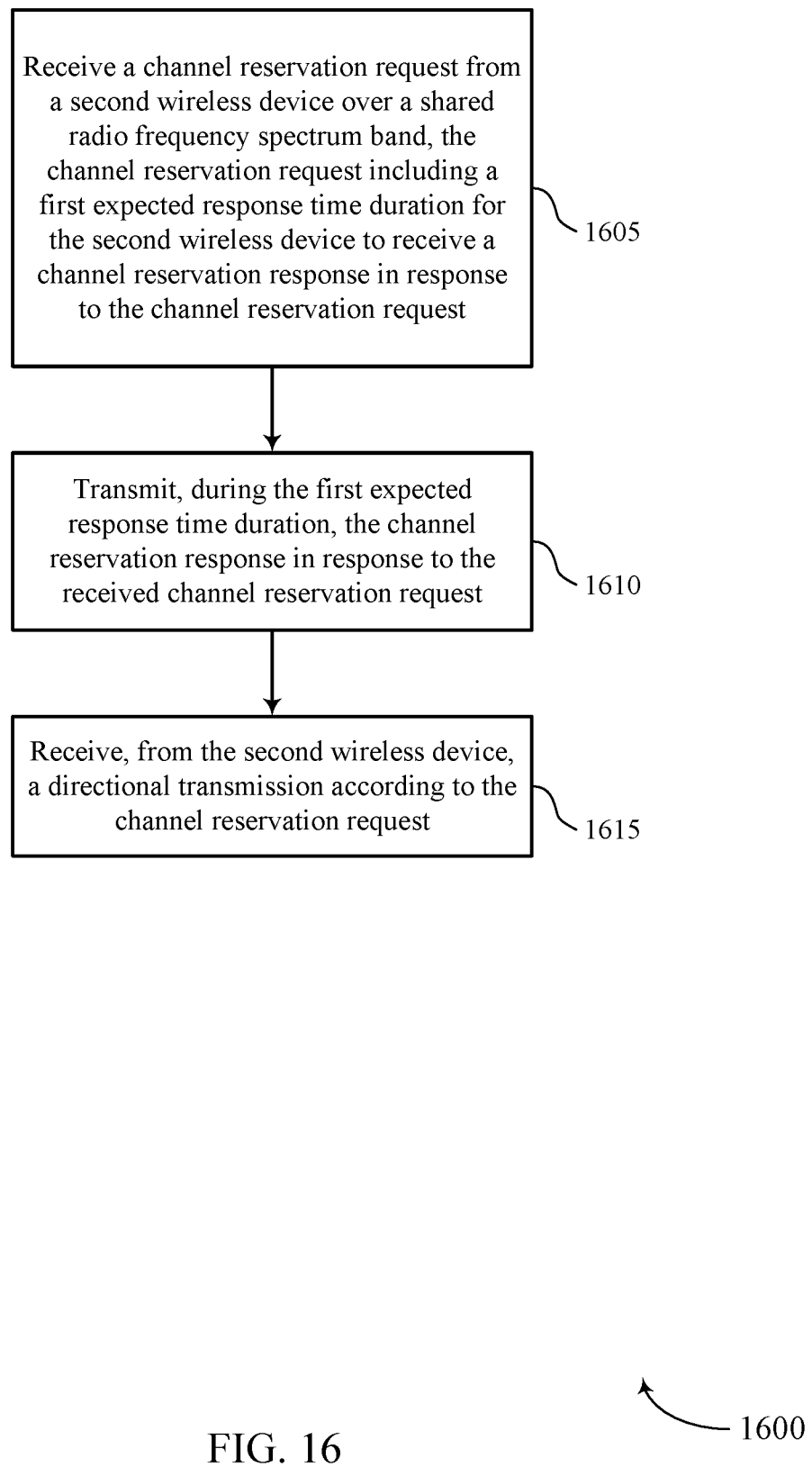

FIG. 16 shows a flowchart illustrating a method 1600 for channel reservation techniques for mmW systems in accordance with various aspects of the present disclosure. The operations of method 1600 may be implemented by a UE 115 and/or base station 105 or its components as described herein. For example, the operations of method 1600 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1605 the UE 115 and/or base station 105 may receive a channel reservation request from a second wireless device over a shared radio frequency spectrum band, the channel reservation request including a first expected response time duration for the second wireless device to receive a channel reservation response in response to the channel reservation request. The operations of block 1605 may be performed according to the methods described with reference to FIGS. 1 through 8. In certain examples, aspects of the operations of block 1605 may be performed by a channel reservation requester as described with reference to FIGS. 9 through 12.

At block 1610 the UE 115 and/or base station 105 may transmit, during the first expected response time duration, the channel reservation response in response to the received channel reservation request. The operations of block 1610 may be performed according to the methods described with reference to FIGS. 1 through 8. In certain examples, aspects of the operations of block 1610 may be performed by a channel reservation responder as described with reference to FIGS. 9 through 12.

At block 1615 the UE 115 and/or base station 105 may receive, from the second wireless device, a directional transmission according to the channel reservation request. The operations of block 1615 may be performed according to the methods described with reference to FIGS. 1 through 8. In certain examples, aspects of the operations of block 1615 may be performed by a directional transmission receiver as described with reference to FIGS. 9 through 12.

Figure 17:
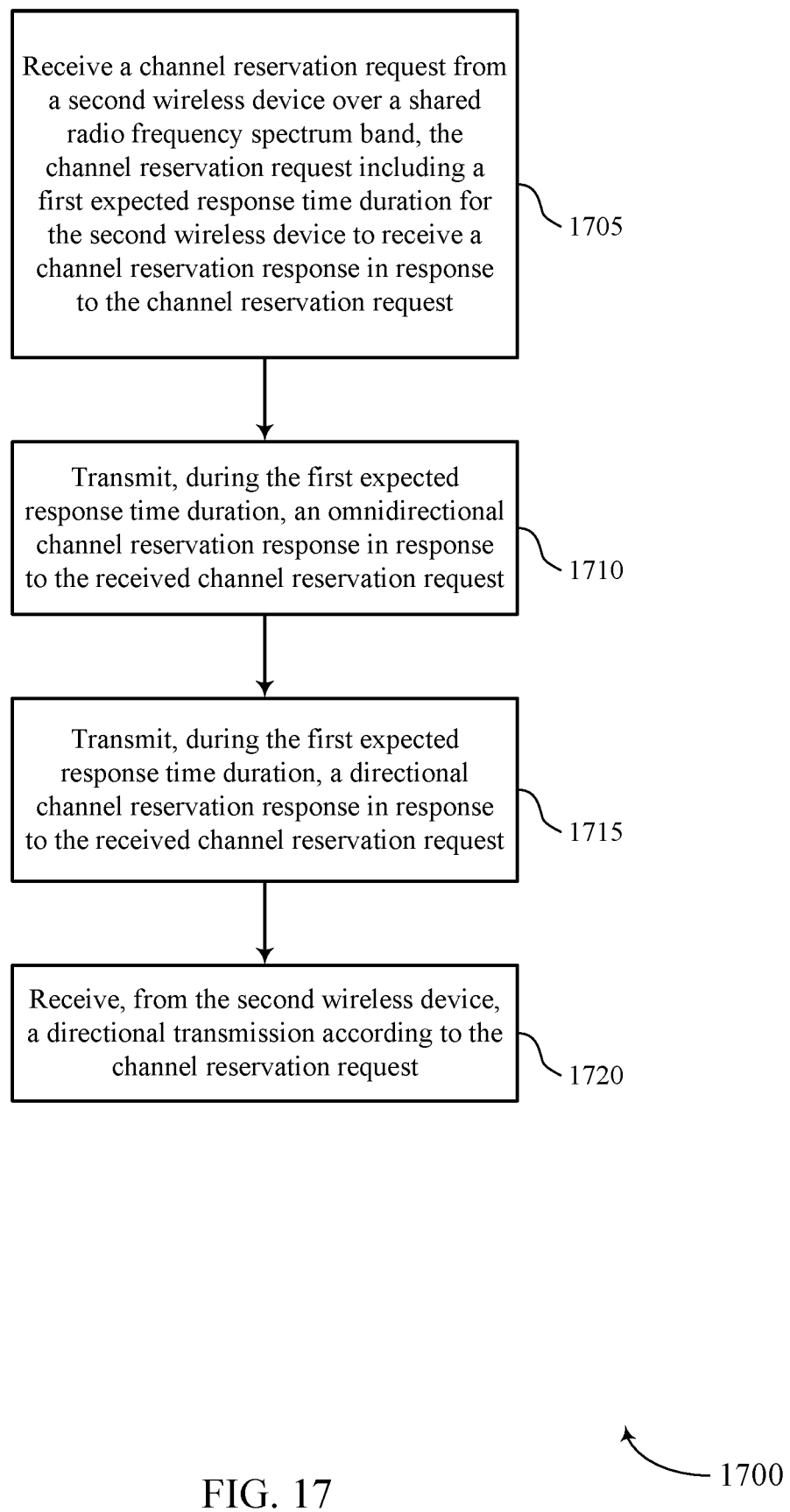

FIG. 17 shows a flowchart illustrating a method 1700 for channel reservation techniques for mmW systems in accordance with various aspects of the present disclosure. The operations of method 1700 may be implemented by a UE 115 and/or base station 105 or its components as described herein. For example, the operations of method 1700 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1705 the UE 115 and/or base station 105 may receive a channel reservation request from a second wireless device over a shared radio frequency spectrum band, the channel reservation request including a first expected response time duration for the second wireless device to receive a channel reservation response in response to the channel reservation request. The operations of block 1705 may be performed according to the methods described with reference to FIGS. 1 through 8. In certain examples, aspects of the operations of block 1705 may be performed by a channel reservation requester as described with reference to FIGS. 9 through 12.

At block 1710 the UE 115 and/or base station 105 may transmit, during the first expected response time duration, an omnidirectional channel reservation response in response to the received channel reservation request. The operations of block 1710 may be performed according to the methods described with reference to FIGS. 1 through 8. In certain examples, aspects of the operations of block 1710 may be performed by a channel reservation responder as described with reference to FIGS. 9 through 12.

At block 1715 the UE 115 and/or base station 105 may transmit, during the first expected response time duration, a directional channel reservation response in response to the received channel reservation request. The operations of block 1715 may be performed according to the methods described with reference to FIGS. 1 through 8. In certain examples, aspects of the operations of block 1715 may be performed by a directional channel reservation responder as described with reference to FIGS. 9 through 12.

At block 1720 the UE 115 and/or base station 105 may receive, from the second wireless device, a directional transmission according to the channel reservation request. The operations of block 1720 may be performed according to the methods described with reference to FIGS. 1 through 8. In certain examples, aspects of the operations of block 1720 may be performed by a directional transmission receiver as described with reference to FIGS. 9 through 12.

In some cases, transmitting the channel reservation response comprises: transmitting, during the first expected response time duration, an omnidirectional channel reservation response in response to the received channel reservation request.

Figure 18:
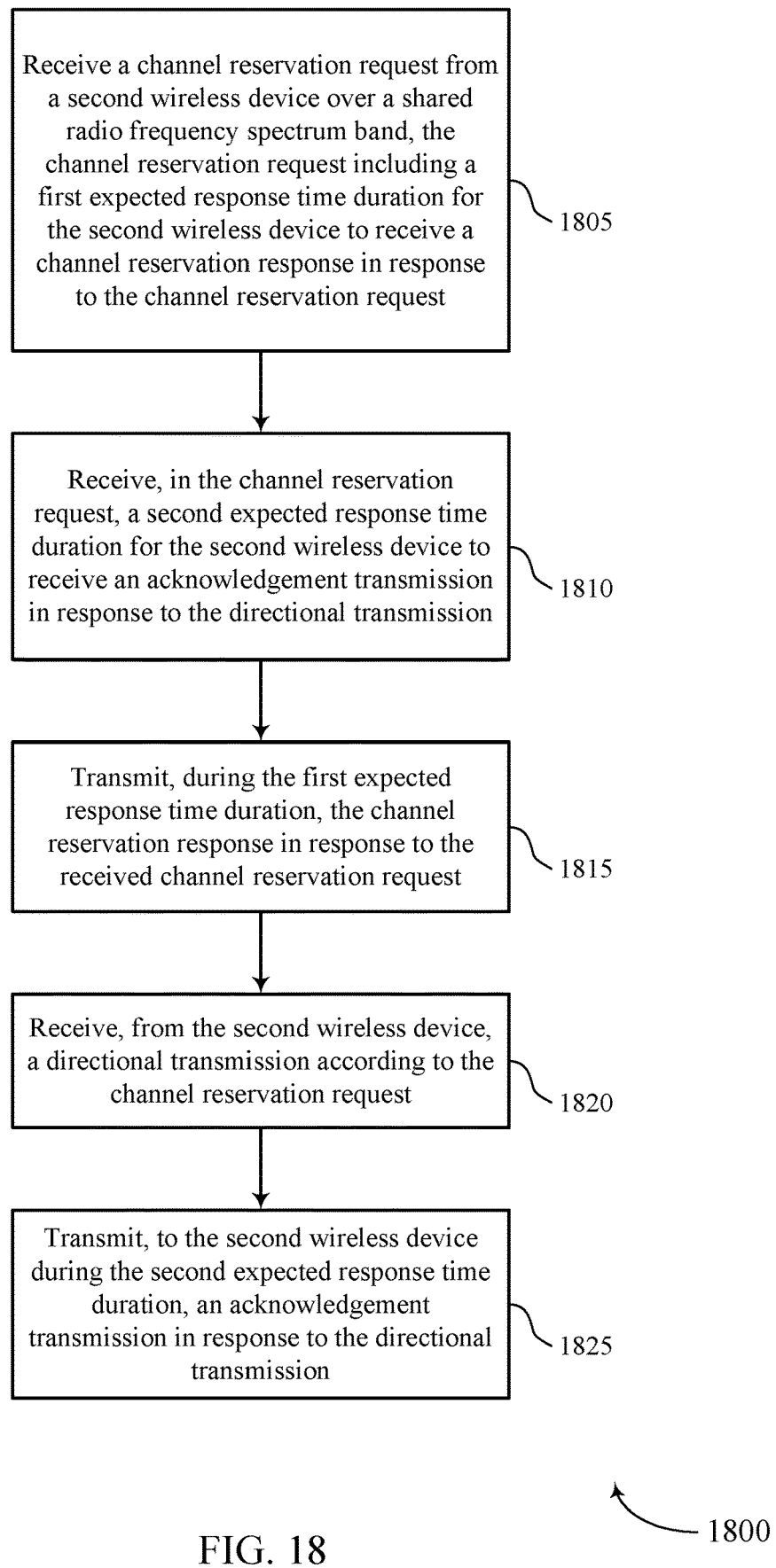

FIG. 18 shows a flowchart illustrating a method 1800 for channel reservation techniques for mmW systems in accordance with various aspects of the present disclosure. The operations of method 1800 may be implemented by a UE 115 and/or base station 105 or its components as described herein. For example, the operations of method 1800 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1805 the UE 115 and/or base station 105 may receive a channel reservation request from a second wireless device over a shared radio frequency spectrum band, the channel reservation request including a first expected response time duration for the second wireless device to receive a channel reservation response in response to the channel reservation request. The operations of block 1805 may be performed according to the methods described with reference to FIGS. 1 through 8. In certain examples, aspects of the operations of block 1805 may be performed by a channel reservation requester as described with reference to FIGS. 9 through 12.

At block 1810 the UE 115 and/or base station 105 may receive, in the channel reservation request, a second expected response time duration for the second wireless device to receive an acknowledgement transmission in response to the directional transmission. The operations of block 1810 may be performed according to the methods described with reference to FIGS. 1 through 8. In certain examples, aspects of the operations of block 1810 may be performed by an acknowledgement manager as described with reference to FIGS. 9 through 12.

At block 1815 the UE 115 and/or base station 105 may transmit, during the first expected response time duration, the channel reservation response in response to the received channel reservation request. The operations of block 1815 may be performed according to the methods described with reference to FIGS. 1 through 8. In certain examples, aspects of the operations of block 1815 may be performed by a channel reservation responder as described with reference to FIGS. 9 through 12.

At block 1820 the UE 115 and/or base station 105 may receive, from the second wireless device, a directional transmission according to the channel reservation request. The operations of block 1820 may be performed according to the methods described with reference to FIGS. 1 through 8. In certain examples, aspects of the operations of block 1820 may be performed by a directional transmission receiver as described with reference to FIGS. 9 through 12.

At block 1825 the UE 115 and/or base station 105 may transmit, to the second wireless device during the second expected response time duration, an acknowledgement transmission in response to the directional transmission. The operations of block 1825 may be performed according to the methods described with reference to FIGS. 1 through 8. In certain examples, aspects of the operations of block 1825 may be performed by an acknowledgement generator as described with reference to FIGS. 9 through 12.

Figure 19:
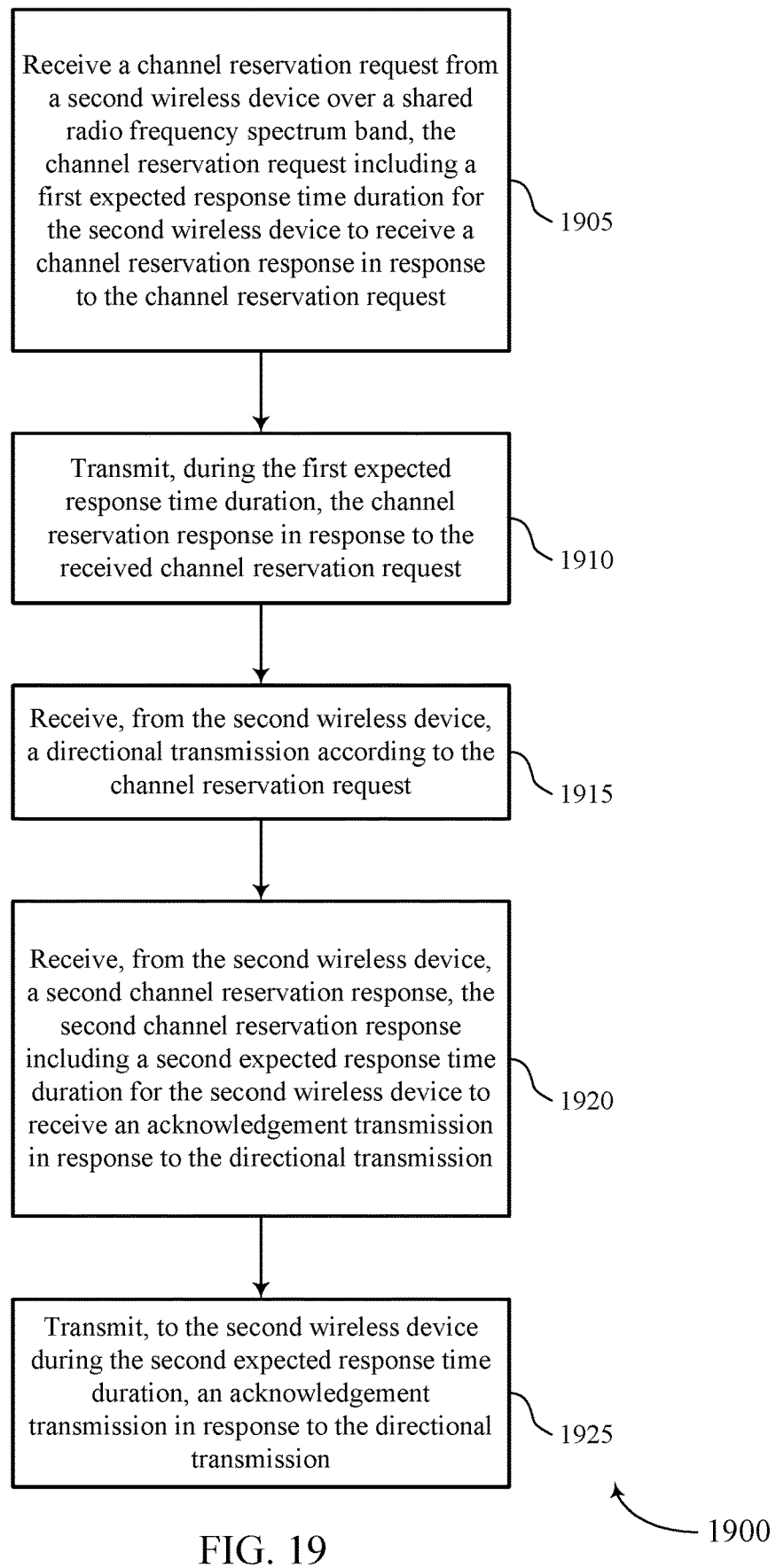

FIG. 19 shows a flowchart illustrating a method 1900 for channel reservation techniques for mmW systems in accordance with various aspects of the present disclosure. The operations of method 1900 may be implemented by a UE 115 and/or base station 105 or its components as described herein. For example, the operations of method 1900 may be performed by a communications manager as described with reference to FIGS. 9 through 12. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1905 the UE 115 and/or base station 105 may receive a channel reservation request from a second wireless device over a shared radio frequency spectrum band, the channel reservation request including a first expected response time duration for the second wireless device to receive a channel reservation response in response to the channel reservation request. The operations of block 1905 may be performed according to the methods described with reference to FIGS. 1 through 8. In certain examples, aspects of the operations of block 1905 may be performed by a channel reservation requester as described with reference to FIGS. 9 through 12.

At block 1910 the UE 115 and/or base station 105 may transmit, during the first expected response time duration, the channel reservation response in response to the received channel reservation request. The operations of block 1910 may be performed according to the methods described with reference to FIGS. 1 through 8. In certain examples, aspects of the operations of block 1910 may be performed by a channel reservation responder as described with reference to FIGS. 9 through 12.

At block 1915 the UE 115 and/or base station 105 may receive, from the second wireless device, a directional transmission according to the channel reservation request. The operations of block 1915 may be performed according to the methods described with reference to FIGS. 1 through 8. In certain examples, aspects of the operations of block 1915 may be performed by a directional transmission receiver as described with reference to FIGS. 9 through 12.

At block 1920 the UE 115 and/or base station 105 may receive, from the second wireless device, a second channel reservation response, the second channel reservation response including a second expected response time duration for the second wireless device to receive an acknowledgement transmission in response to the directional transmission. The operations of block 1920 may be performed according to the methods described with reference to FIGS. 1 through 8. In certain examples, aspects of the operations of block 1920 may be performed by an acknowledgement manager as described with reference to FIGS. 9 through 12.

At block 1925 the UE 115 and/or base station 105 may transmit, to the second wireless device during the second expected response time duration, an acknowledgement transmission in response to the directional transmission. The operations of block 1925 may be performed according to the methods described with reference to FIGS. 1 through 8. In certain examples, aspects of the operations of block 1925 may be performed by an acknowledgement generator as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000

1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and wireless communication system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    transmitting, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request;
    receiving the channel reservation response from the second wireless device during the first expected response time duration;
    transmitting, to the second wireless device, a directional transmission according to the directional channel reservation request; and
    transmitting, by the first wireless device, a second channel reservation request following the directional transmission, the second channel reservation request including a second expected response time duration for the first wireless device to receive an acknowledgement in response to the directional transmission.

2. The method of claim 1, wherein the directional channel reservation request further comprises:
    a second duration indicating an expected time for the first wireless device to receive an acknowledgement in response to the directional transmission.

3. The method of claim 1, further comprising:
    transmitting an omnidirectional channel reservation request over the shared radio frequency spectrum band, the omnidirectional channel reservation request comprising a second expected response time duration for the first wireless device to receive the channel reservation response from the second wireless device in response to the directional channel reservation request.

4. The method of claim 3, wherein the directional channel reservation request is transmitted prior to the omnidirectional channel reservation request, and the first expected response time duration is longer than the second expected response time duration.

5. The method of claim 3, wherein the omnidirectional channel reservation request is transmitted prior to the directional channel reservation request, and the second expected response time duration is longer than the first expected response time duration.

6. The method of claim 1, wherein receiving the channel reservation response comprises:
    receiving the channel reservation response from the second wireless device on a receive beam over the shared radio frequency spectrum band.

7. The method of claim 1, further comprising:
    transmitting the directional transmission to the second wireless device on a transmit beam over the shared radio frequency spectrum band.

8. The method of claim 1, further comprising:
    receiving, on a receive beam over the shared radio frequency spectrum band, an acknowledgement in response to the directional transmission.

9. The method of claim 1, further comprising:
    performing a contention-based protocol prior to transmitting the directional channel reservation request over the shared radio frequency spectrum band.

10. The method of claim 1, wherein the first expected response time duration for the first wireless device to receive the channel reservation response from the second wireless device comprises a time duration for the first wireless device to receive a directional channel reservation response from the second wireless device, or a time duration for the first wireless device to receive an omnidirectional channel reservation response from the second wireless device, or a combination thereof.

11. The method of claim 1, wherein the directional transmission is transmitted using a different transmit beam than the transmit beam of the directional channel reservation request.

12. A method for wireless communication, comprising:
receiving a channel reservation request from a second wireless device over a shared radio frequency spectrum band, the channel reservation request including a first expected response time duration for the second wireless device to receive a channel reservation response in response to the channel reservation request;
transmitting, during the first expected response time duration, the channel reservation response in response to the received channel reservation request;
receiving, from the second wireless device, a directional transmission according to the channel reservation request;
receiving, from the second wireless device, a second channel reservation response, the second channel reservation response including a second expected response time duration for the second wireless device to receive an acknowledgement in response to the directional transmission; and
transmitting, to the second wireless device during the second expected response time duration, the acknowledgement in response to the directional transmission.

13. The method of claim 12, wherein transmitting the channel reservation response comprises:
transmitting, during the first expected response time duration, an omnidirectional channel reservation response in response to the received channel reservation request; and
transmitting, during the first expected response time duration, a directional channel reservation response in response to the received channel reservation request.

14. The method of claim 13, wherein transmitting the directional channel reservation response comprises:
transmitting the directional channel reservation response to the second wireless device on a transmit beam over the shared radio frequency spectrum band.

15. The method of claim 13, wherein transmitting the directional channel reservation response comprises:
transmitting the directional channel reservation response to the second wireless device, the second wireless device to receive the directional channel reservation response on a receive beam over the shared radio frequency spectrum band.

16. The method of claim 13, wherein:
the omnidirectional channel reservation response comprises a second expected response time duration for the directional transmission to be received and an acknowledgement to be transmitted; and
the directional channel reservation response comprises a third expected response time duration for the directional transmission to be received and the acknowledgement to be transmitted.

17. The method of claim 12, wherein transmitting the channel reservation response further comprises:

transmitting, during the first expected response time duration, a first directional channel reservation response in response to the received channel reservation request; and
transmitting, during the first expected response time duration, a second directional channel reservation response in response to the received channel reservation request, wherein the first directional channel reservation response and the second directional channel reservation response are directed to different wireless devices.

18. The method of claim 12, further comprising:
receiving, in the channel reservation request, a second expected response time duration for the second wireless device to receive an acknowledgement in response to the directional transmission; and
transmitting, to the second wireless device during the second expected response time duration, the acknowledgement in response to the directional transmission.

19. The method of claim 12, further comprising:
receiving the directional transmission from the second wireless device on a receive beam over the shared radio frequency spectrum band.

20. The method of claim 12, wherein transmitting the channel reservation response comprises:
transmitting a first directional channel reservation response on a first transmit beam to an expected location of the second wireless device; and
transmitting a second directional channel reservation response on a second transmit beam to an expected location of a third wireless device.

21. The method of claim 12, further comprising:
transmitting, on a transmit beam over the shared radio frequency spectrum band, an acknowledgement in response to the received directional transmission.

22. An apparatus for wireless communication at a first wireless device, comprising:
a processor;
memory in electronic communication with the processor; and
instructions stored in the memory and operable, when executed by the processor, to cause the first wireless device to:
transmit, to a second wireless device, a directional channel reservation request on a transmit beam over a shared radio frequency spectrum band, the directional channel reservation request including a first expected response time duration for the first wireless device to receive a channel reservation response from the second wireless device in response to the directional channel reservation request;
receive the channel reservation response from the second wireless device during the first expected response time duration;
transmit, to the second wireless device, a directional transmission according to the directional channel reservation request; and
transmit, by the first wireless device, a second channel reservation request following the directional transmission, the second channel reservation request including a second expected response time duration for the first wireless device to receive an acknowledgement in response to the directional transmission.

23. The apparatus of claim 22, wherein the directional channel reservation request further comprises:
a second duration indicating an expected time for the first wireless device to receive an acknowledgement in response to the directional transmission.

24. The apparatus of claim 22, wherein the first expected response time duration includes a time duration for the first wireless device to receive a directional channel reservation response from the second wireless device, or a time duration for the first wireless device to receive an omnidirectional channel reservation response from the second wireless device, or a combination thereof.

25. An apparatus for wireless communication at a first wireless device, comprising:
 a processor;
 memory in electronic communication with the processor; and
 instructions stored in the memory and operable, when executed by the processor, to cause the first wireless device to:
  receive a channel reservation request from a second wireless device over a shared radio frequency spectrum band, the channel reservation request including a first expected response time duration for the second wireless device to receive a channel reservation response in response to the channel reservation request;
  transmit, during the first expected response time duration, the channel reservation response in response to the received channel reservation request;
  receive, from the second wireless device, a directional transmission according to the channel reservation request;
  receive, from the second wireless device, a second channel reservation response, the second channel reservation response including a second expected response time duration for the second wireless device to receive an acknowledgement in response to the directional transmission; and
  transmit, to the second wireless device during the second expected response time duration, the acknowledgement in response to the directional transmission.

26. The apparatus of claim 25, wherein transmitting the channel reservation response comprises:
 transmitting, during the first expected response time duration, an omnidirectional channel reservation response in response to the received channel reservation request; and
 transmitting, during the first expected response time duration, a directional channel reservation response in response to the received channel reservation request.

27. The apparatus of claim 26, wherein transmitting the directional channel reservation response comprises:
 transmitting the directional channel reservation response to the second wireless device on a transmit beam over the shared radio frequency spectrum band.

* * * * *